(12) United States Patent
Matsunaga et al.

(10) Patent No.: US 7,877,699 B2
(45) Date of Patent: Jan. 25, 2011

(54) MULTILAYERED TASK SUPPORTING APPARATUS AND METHOD FOR SUPPORTING MULTILAYERED TASK

(75) Inventors: Yoshifumi Matsunaga, Kanagawa (JP); Akinori Komura, Kanagawa (JP); Hiroyuki Hattori, Kanagawa (JP); Hideto Yuzawa, Kanagawa (JP); Tomokazu Yago, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 275 days.

(21) Appl. No.: 11/332,222

(22) Filed: Jan. 17, 2006

(65) Prior Publication Data

US 2007/0063970 A1 Mar. 22, 2007

(30) Foreign Application Priority Data

Sep. 20, 2005 (JP) ............................ P2005-272052

(51) Int. Cl.
*G06F 3/048* (2006.01)
(52) U.S. Cl. ...................... 715/769; 345/172; 707/802; 715/790
(58) Field of Classification Search ................ 715/790; 345/172
See application file for complete search history.

(56) References Cited

U.S. PATENT DOCUMENTS

| | | | | |
|---|---|---|---|---|
| 5,265,009 A * | 11/1993 | Colavita | ........................ | 463/1 |
| 5,287,449 A * | 2/1994 | Kojima | ........................ | 345/161 |
| 5,416,666 A | 5/1995 | Maguire, Jr. | | |
| 5,502,616 A | 3/1996 | Maguire, Jr. | | |
| 5,664,129 A * | 9/1997 | Futatsugi et al. | ............ | 715/763 |
| 5,758,111 A * | 5/1998 | Shiratori et al. | ............. | 715/788 |
| 5,892,509 A * | 4/1999 | Jakobs et al. | ................. | 715/751 |
| 5,944,785 A * | 8/1999 | Pommier et al. | ............ | 709/205 |
| 6,459,442 B1 * | 10/2002 | Edwards et al. | ............. | 715/863 |
| 6,611,253 B1 * | 8/2003 | Cohen | ........................ | 345/168 |
| 7,092,928 B1 * | 8/2006 | Elad et al. | ..................... | 706/60 |
| 7,274,375 B1 * | 9/2007 | David | ......................... | 345/619 |
| 2002/0163537 A1 * | 11/2002 | Vernier et al. | ............... | 345/751 |
| 2003/0222913 A1 * | 12/2003 | Mattila et al. | ............... | 345/764 |
| 2004/0046784 A1 * | 3/2004 | Shen et al. | .................... | 345/733 |
| 2004/0119762 A1 * | 6/2004 | Denoue et al. | ............. | 345/863 |

FOREIGN PATENT DOCUMENTS

| | | |
|---|---|---|
| JP | A 62-272810 | 11/1987 |
| JP | 63-200226 A | 8/1988 |
| JP | 06-075739 A | 3/1994 |

(Continued)

OTHER PUBLICATIONS

Reinhold, Arnold, Big Number Calculator Applet, © 2000 (world.std.com/~reinhold/BigNumCalc.html).*

(Continued)

*Primary Examiner*—William L Bashore
*Assistant Examiner*—Ashraf Zahr
(74) *Attorney, Agent, or Firm*—Oliff & Berridge, PLC

(57) ABSTRACT

A multilayered task supporting apparatus includes: a display area that is divided into three or more; an input unit that is provided with a group of control buttons for assigning a display object; and a control unit that controls a content to be displayed on the display area on the basis of an input from the input unit.

10 Claims, 22 Drawing Sheets

FOREIGN PATENT DOCUMENTS

| | | |
|---|---|---|
| JP | 06-178082 A | 6/1994 |
| JP | 06-266498 A | 9/1994 |
| JP | 07-231814 A | 9/1995 |
| JP | 3020225 U | 10/1995 |
| JP | 09-128118 A | 5/1997 |
| JP | 2001-306631 A | 11/2001 |
| JP | 2001-337745 A | 12/2001 |
| JP | 2002-244798 A | 8/2002 |
| JP | 2003-347774 A | 12/2003 |
| JP | 2004-094394 A | 3/2004 |
| JP | A 2004-240605 | 8/2004 |

OTHER PUBLICATIONS

Reinhold, Arnold, Big Number Calculator Applet, © 2000 (world.std.com/~reinhold/BigNumCalc.html).*

Office Action issued in JP Application No. 2005-272052 on Aug. 13, 2010 (with English translation).

* cited by examiner

FIG. 6

BUTTON ATTRIBUTE MANAGEMENT TABLE

| LABEL | COLOR | DISPLAY POSITION | FORM | ACTIVATION ACTION | ADJECTIVE | ... |
|-------|-------|------------------|------|-------------------|-----------|-----|
| | | | | | | ... |

FIG. 8

| | | SLOT FOR ARITHMETIC OBJECT 1 | SLOT FOR ARITHMETIC OBJECT 2 |
|---|---|---|---|
| BUTTON ATTRIBUTE | LABEL | LE MARIAGE DE FIGARO | INFORMATION PRESENTATION DEVICE |
| | DISPLAY PORTION | | |
| | COLOR | | |
| | FORM | | |
| | EFFECT SOUND 1 | | |
| | EFFECT SOUND 2 | | |
| | ... | | |
| CONTENT ATTRIBUTE | CONTENT ATTRIBUTE KW (PLURAL) | CLASSIC, OPERA | PLURAL, THOROUGH GRASP |
| | WHAT | LE MARIAGE DE FIGARO, OPERA | INFORMATION PRESENTATION DEVICE |
| | WHO | MOZART, CLASSICAL SCHOOL | XXXX |
| | WHEN | 1786 | 1994 |
| | WHERE | WIEN | YOKOHAMA |
| | WHY | CLASS STRUGGLE | PATENT APPLICATION |
| | HOW 1 | SPLENDID, LIGHT | HARD, THICK |
| | HOW 2 | MUSIC | SPECIFICATION, DOCUMENT, CHARACTER |
| | HOW 3 | | |

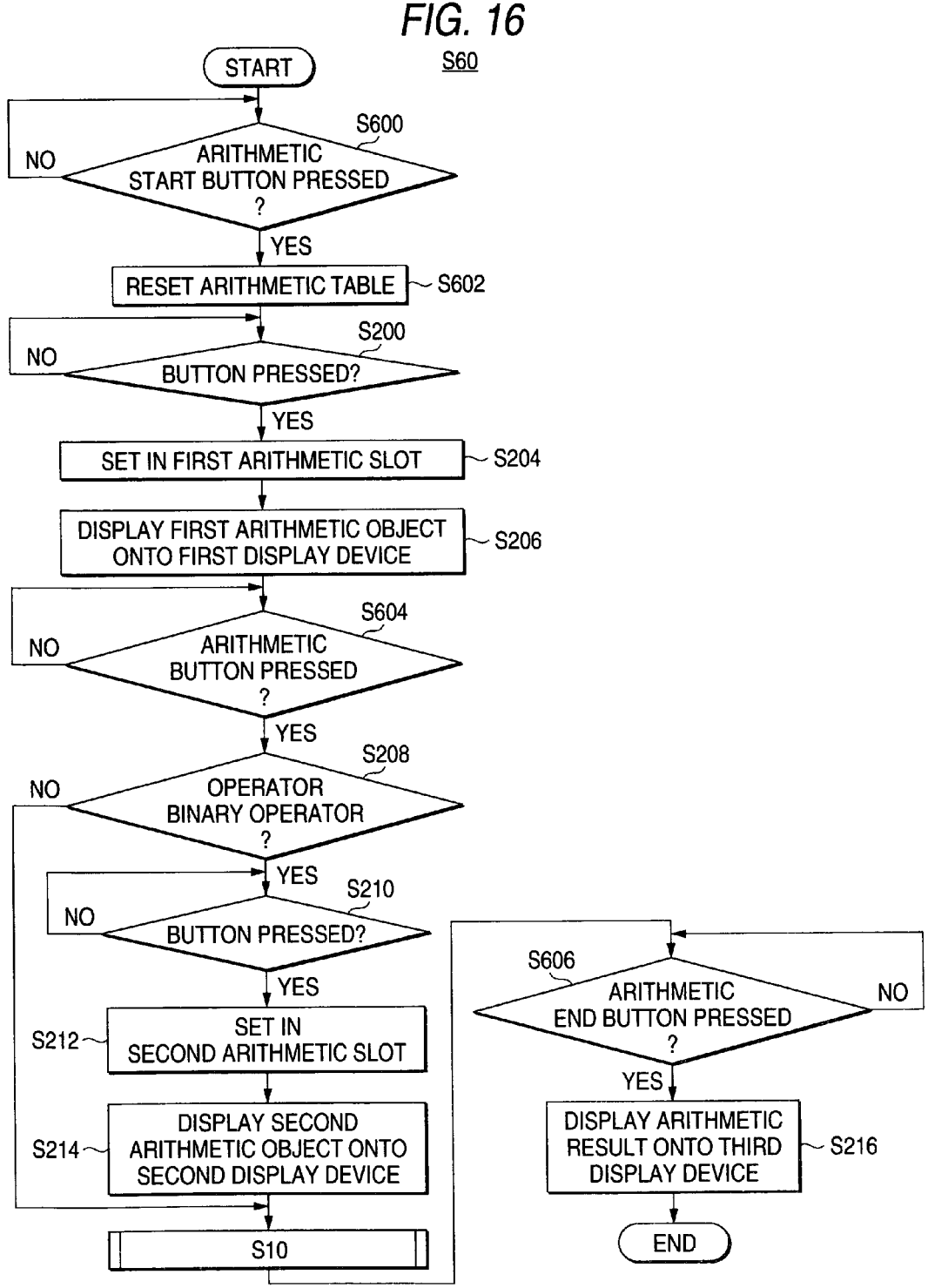

MULTILAYERED TASK SUPPORTING APPARATUS AND METHOD FOR SUPPORTING MULTILAYERED TASK

FIELD

The present invention relates to a technology that provides a computing environment for pursuing a plurality of complex tasks by effectively integrating a plurality of computer environments such as a personal computer, a display, and a speaker.

BACKGROUND

On a desk of an office or a home, physical goods, such as documents or the like are dispersed. There is a case in which a person who is well put in order expands various related documents at the time of use. A personal computer (hereinafter, referred to as PC) is just one of physical goods, and, even when the IT/network age, a person spreads ones, such as documents, notes, or diary, other than electronics, and performs a task with reference to various kinds information.

This is a limitation to enhance intelligent productivity. Of course, this is not a cause for an intrinsic obstruction. A problem is that the rapid reference of various kinds of required information is not subjected to a scalpel. Although various kinds of information spread through a network, all what is provided is just a function of search of such information. The sort and examination of various kinds of searched information are not considered yet.

When a person truly requires the information is just the time that the person wants the information. Further, it is the time that a consideration is taken on the basis of the information, that is, during the consideration. At that time, if the timely reference cannot be made, it is meaningless. When a search is performed after the consideration "I suppose that is . . . ", the consideration is interrupted. At present, the search is a mode of inspection, and is an examination which is performed by a person, who wants the information, or which is entrusted to another person. Since the examination is not the consideration in parallel, unlike an intelligent production, the examination is just a part of a process of an intelligent production, for example. As for the intelligent production, in a state in which the required information can be immediately viewed, regardless of the examination, the consideration is expanded while appreciating the information, and a new idea is produced. Unfortunately, an information environment for the intelligent production does not exist.

What is important is an access speed to the information for the maintenance and progress of the consideration. The information access is impossible in the information examination mode. When the required information is presented, and the consideration is made on the basis of the information, it can be understood that the consideration is accessed to the information. The phase that 'the consideration is accessed' is important.

In order to obtain the progress of the consideration, it is necessary to realize 1) a person can get the required information quickly and 2) the information is expanded widely and is arranged to the extent of the change of his sight.

As for 1), as described above, the search is not problematic. The problem is how peripheral information in a paper or electronic form gets in a form to be referred to. When multiple tasks exist, the sort/change speed of the set is problematic.

As for 2), in one PC at present, there is a problem in that an information display space excessively narrows. Since the information display space is narrow, and the character is small, if multiple windows open in one display, it is difficult to handle the information. That is, the information cannot be immediately viewed, an operation needs to be performed to take an overlap window at first while considering benefits. As a result, the reference information is output to a printer for ease of viewing, is printed on a paper, and is disposed at a visible position. Of course, there are many cases in which the papers are distributed for a conference or the like, and it takes much time to scan and adjust them (that is, at present, it takes much time for scanning). The two problems are a problem in that the electronic materials and paper materials are mixed, and a problem in that, even when one PC is used and the total area is increased by enlarging only the display, processing capacity of the CPU does not meet. For example, it is difficult to simultaneously support a plurality of conference images by one PC.

As a result, a person expands the related paper documents in the periphery while displaying a mail or Web information, document information, and the like through the PC. In order to adjust this situation and to enhance productivity, a new task support environment, which can perform a high-speed access to information and parallel reference, laying stress on the PC, needs to be considered. In particular, an intelligent producer, such as a project manager or an office worker, charges various tasks, and meets another task or checks the progress of another task (a background processing by a computer) at a side glance while laying emphasis on one task. That is, a complex and multilayered task method is taken.

SUMMARY

The inventors have studied a multilayer/multiple task support method how to enhance productivity of an intelligent producer during multiple tasks progress in a multilayered manner. The multilayer represents a mode in which the problem to be wrapped up is layered in a time-variant manner. Our task is plurally and simultaneously generated, and is scheduled according to a different due date or priority. That is, from a viewpoint that the person directly faces, even one task in one period, a current task is progressing, and thus a person constantly perceives that in a part of the mind, and changes the consideration even when he is absorbed in another task. The multilayer/multiple task represents a work style in which this state is positively perceived, and works, which can overlap, positively overlaps. A support environment for supporting the multilayer/multiple work style is demanded.

In JP-A-62-272810, a method in which various kinds of information are displayed in a touch manner has been disclosed.

However, a method of attaching arbitrary information to a button, and a method of performing an arithmetic operation between information by a button operation are not disclosed. Further, a method of collectively performing an arithmetic operation of information, such as documents, over a plurality of computers is not disclosed.

The present invention provides a multilayered task support system that simply performs an access to information at high speed and performs representation of contents to be accessed in parallel.

A multilayered task supporting apparatus includes: a display area that is divided into three or more; an input unit that is provided with a group of control buttons for assigning a display object; and a control unit that controls a content to be displayed on the display area on the basis of an input from the input unit.

A method is for supporting multilayered task, including: receiving an input from an input unit that is provided with a group of control buttons for assigning a display object; controlling a display content on the basis of the received input; and displaying the controlled display content onto at least one of three or more display areas to be provided.

A program product is for causing a computer system to execute procedures for supporting multilayered task including: receiving an input from an input unit that is provided with a group of control buttons for assigning a display object; controlling a display content on the basis of the received input; and displaying the controlled display content onto at least one of three or more display areas to be provided.

BRIEF DESCRIPTION OF THE DRAWINGS

In the accompanying drawings:

FIG. 4A illustrates the arrangement of a group of control buttons to be displayed on the information access device and FIG. 4B illustrates the display method of a plurality of buttons;

FIG. 6 is a diagram illustrating a button attribute management table that defines an individual button;

FIG. 8 is a diagram illustrating attributes to be stored in an arithmetic object slot when an arithmetic operation is performed;

FIG. 16 is a flowchart sowing a button arithmetic processing (S60) in the multilayered task supporting apparatus according to the second embodiment;

FIG. 17B is a diagram a button V displayed in FIG. 17A on a magnified scale and FIG. 17C illustrates a screen to be displayed when a range W of FIG. 17B is consecutively pressed;

FIG. 18A illustrates a task set searched by use of a button attribute as 'MUSIC' as a keyword and FIG. 18B illustrates a diagram in which a plurality of searched buttons are classified according to the detailed attributes;

DETAILED DESCRIPTION

First Embodiment

Figure 1:
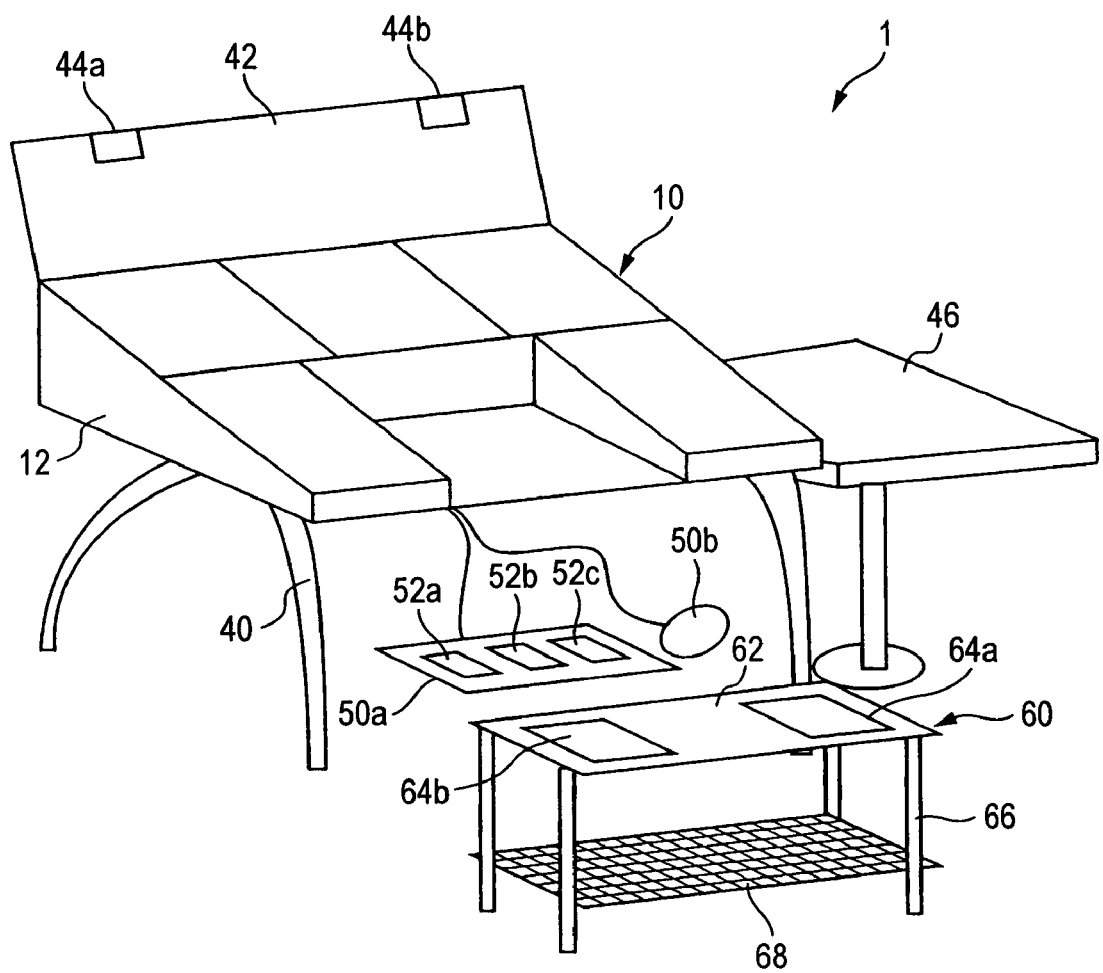
FIG. 1 is a diagram showing a multilayered task support system, laying emphasis on a multilayered task supporting apparatus.

FIG. 1 is a diagram showing a multilayered task support system 1 that is configured to have a multilayered task supporting apparatus 10.

As shown in FIG. 1, the multilayered task support system 1 includes the multilayered task supporting apparatus 10, foot switches 50a and 50b, a chair 60 with a display device, and a side table 46. With this configuration the multilayered task support system 1 provides an environment in which a user can efficiently process multiple tasks.

Moreover, hereinafter, in a case in which any one of plural parts, such as the foot switches 50a and 50b or the like, does not need to be specified, the parts are simply represented, for example, by the foot switch 50.

The multilayered task supporting apparatus 10 is configured to have an apparatus main body 12, and has leg portions 40 that support the apparatus main body 12, and a cover panel 42 that is openably provided on the top surface of the apparatus main body 12. The cover panel 42 has a sufficient size to cover the top surface of the apparatus main body 12. When the cover panel 42 is closed, the cover panel 42 is locked by keys 44a and 44b. Moreover, the cover panel 42 and the leg portions 40 may be detachably provided, or the apparatus main body 12 may be used to be installed on a table or the like.

The foot switch 50a has pedals 52a to 52c, and is connected to the apparatus main body 12. The foot switch 50b also has pedals (not shown). The foot switch 50 receives an input from a user through the pedal 52 and outputs it to the apparatus main body 12.

The chair 60 with a display device is configured such that a seat portion 62 is supported by leg portions 66. On the top surface of the seat portion 62, display devices 64a and 64b are disposed, and, below the seat portion 62, a storage 68 is provided. The display device 64 is connected to the apparatus main body 12 in a wired or wireless manner, and displays predetermined information by the control of the multilayered task supporting apparatus 10 described below. In the storage 68, papers, pens, books, and other physical goods are stored.

On the top surface of the side table 46, paper mediums, such as dictionaries, newspapers, magazines, and the like, are disposed.

Figure 2:
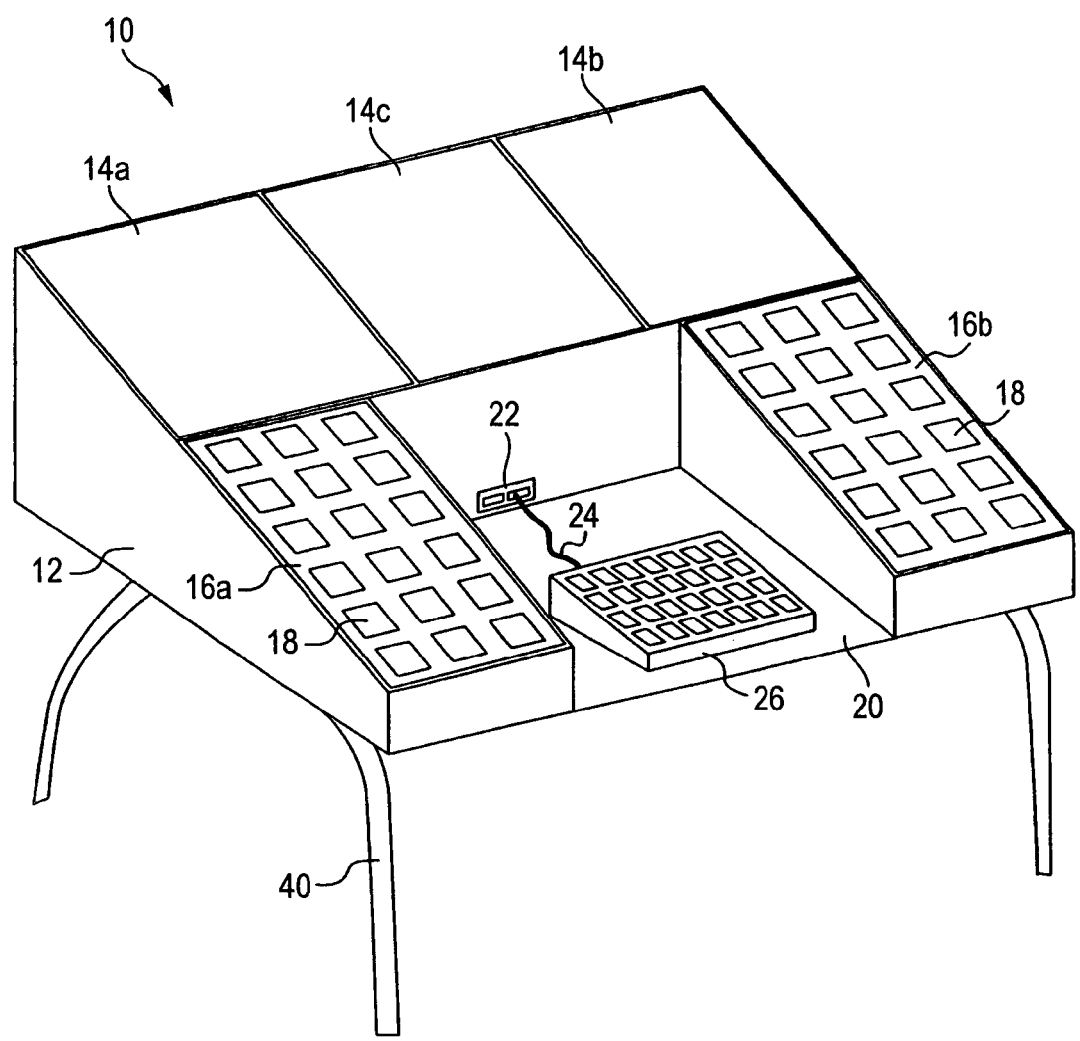
FIG. 2 is a diagram illustrating the details of the multilayered task supporting apparatus according to a first embodiment.

FIG. 2 is a diagram illustrating the details of the multilayered task supporting apparatus 10 according to the present invention.

As shown in FIG. 2, the multilayered task supporting apparatus 10 further has three displays 14a to 14c, information access devices 16a and 16b (input unit) in which a group of control buttons for assigning a display object is disposed, and an input/output interface (IF) 22. Further, the multilayered task supporting apparatus 10 has a speaker (not shown) that outputs a predetermined sound.

The displays 14a to 14c are provided in front of the apparatus main body 12, and are arranged in a horizontal direction. The displays 14a to 14c are, for example, liquid crystal displays having the same screen size. The display 14 is controlled by a control device 100 described below so as to display predetermined information.

Moreover, the display 14 may be a display of a virtual computer. Further, the display 14 may be a CRT, a PDP, or the like. The displays 14a to 14c may have different screen sizes from one another.

The information access devices 16a and 16b are provided on both of left and right sides of the apparatus main body 12 before the display 14 with respect to the user. The information access device 16 is controlled by the control device 100 so as to display predetermined information. In addition, the information access device 16 receives an input from the user and outputs it to the control device 100. The information access device 16 is preferably one which can flexibly perform display of a key top. For example, a touch panel can be considered.

Moreover, the information access device 16 may be provided on any one of the left and right sides of the apparatus main body 12.

In the information access device 16, a plurality of buttons 18 are provided, and the group of control buttons is constituted by these buttons 18. To each button 18, a predetermined operation, such as assignment of a display object or an arithmetic operation, is allocated. When the button 18 is pressed, the information access device 16 receives desired assignment from the user.

Moreover, the attribute of the button 18, the operation when the button 18 is pressed, and the like will be described below.

Between the information access devices 16a and 16b, an installment portion 20, in which a predetermined object is installed, is provided. On the top surface of the installment portion 20, an input device 26, such as a PC or the like, may be installed. Here, the input device 26 is connected to the input/output IF 22 through a communication cable 24, and communicates data with the control device 100 of the multilayered task supporting apparatus 10.

Figure 3:
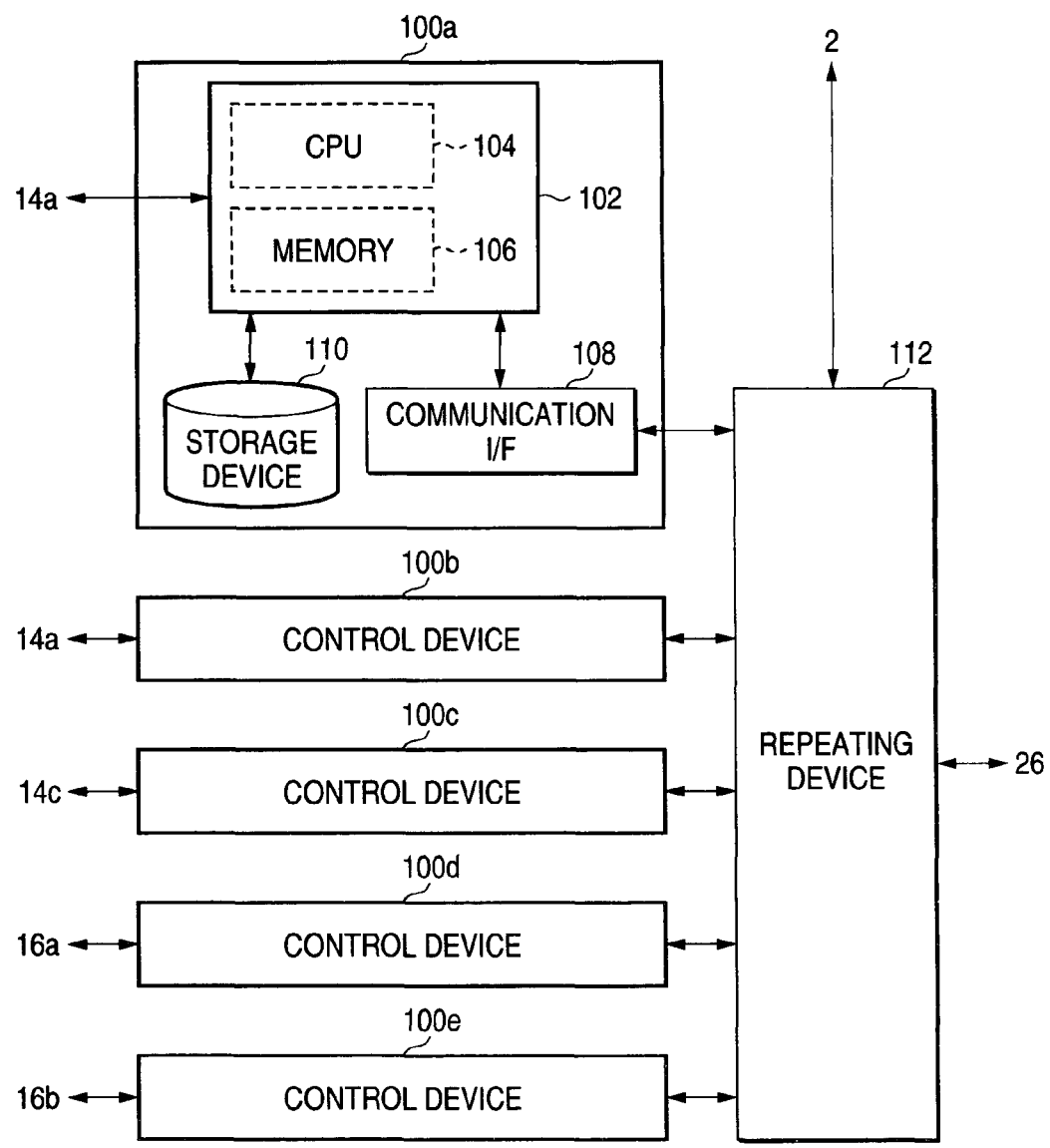
FIG. 3 is a diagram showing the hardware configuration of a computer that is used in the multilayered task supporting apparatus.

FIG. 3 is a diagram showing the hardware configuration of a computer that is used in the multilayered task supporting apparatus 10.

As shown in FIG. 3, the multilayered task supporting apparatus 10 has control devices 100a to 100e, and a repeating device 112. Each of the control devices 100a to 100e has a processing device 102 including a CPU 104 and a memory 106, a communication IF 108, and a storage device 110.

In the control device 100, the communication IF 108 communicates predetermined data with other control devices 100, the external input device 26, and a network 2 through the repeating device 112. The storage device 110 is, for example, an HDD device, a CD device, or a DVD device, and stores and reproduces data.

As such, the control device 100 has a part, serving as a computer, which can perform information processing by the execution of a program and the communication with other control devices 100 and the like through the network.

The repeating device 112 repeats data to be transmitted and received among the control devices 100, and performs the communication with the external computer (not shown), which is connected thereto through the input device 26 and the network 2, through the input/output IF 22. Moreover, the repeating device 112 may be implemented as a server. Further, when the control device 100 is implemented in a form having a network address, such as a PC or the like, the control devices may be directly connected to one another in a Peer-to-Peer manner, not through the repeating device 112.

Further, the control device 100a controls information to be displayed onto the first display 14a, the control device 100b controls information to be displayed onto the second display 14b, and the control device 100c controls information to be displayed onto the third display 14c. The control device 100d controls information to be displayed onto the first information access device 16a, and receives an input from the first information access device 16a. Similarly, the control device 100e controls information to be displayed onto the second information access device 16b, and receives an input from the second information access device 16b. As such, the displays 14a to 14c and the information access devices 16a and 16b are controlled by different control devices 100. The control device may be implemented by a normal PC.

In addition, the control device 100a causes to the second display 14b, the third display 14c, and the information access devices 16a and 16b to display predetermined information. In this case, for example, the control device 100a communicates data with the control device 100b and causes the second device 14b to display information. Further, the control device 10a receives data input from the information access devices 16a and 16b through the control devices 100d and 100e. Each of the control devices 100b to 100e also causes any one display 14 to display information and receives data from any one information access device 16.

Moreover, any one control device 100 may control a plurality of displays 14 and the information access devices 16 or may control all of them. Further, in one control device 100, a plurality of CPU 104 and memories 106 may be included. The display of the first to third displays 14a-14c may be processed in parallel manner, thereby to perform a plurality of various tasks efficiently and comfortably.

Figure 4A:
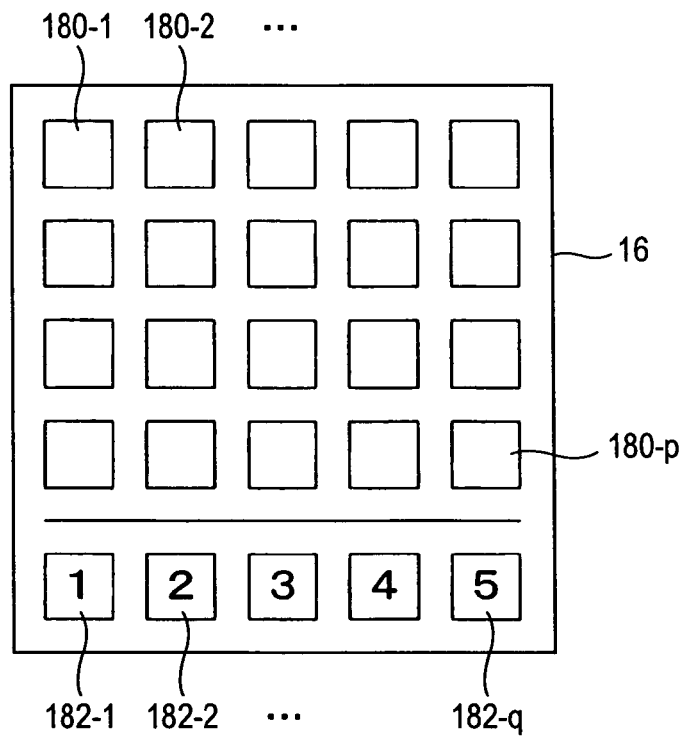
FIGS. 4A and 4B illustrate a group of control buttons of an information access device, and specifically.
Figure 4B:
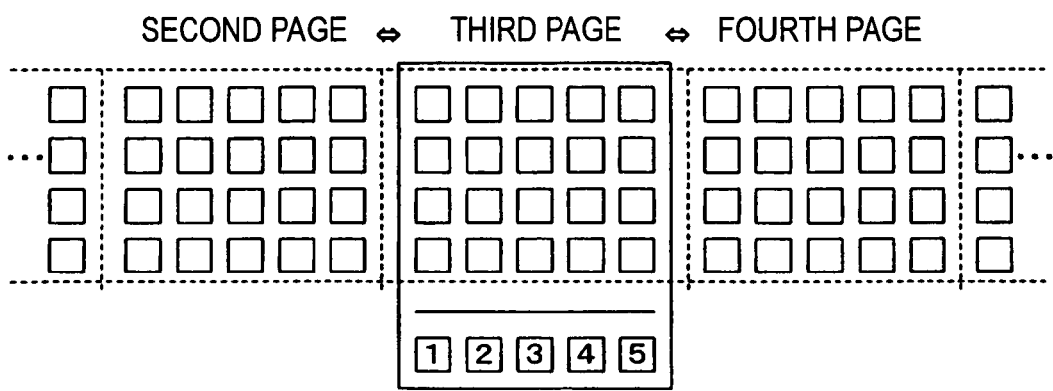

FIGS. 4A and 4B illustrate the group of control buttons of the information access device 16. FIG. 4A illustrates the arrangement of the group of control buttons to be displayed onto the information access device 16, and FIG. 4B illustrates a display method of a plurality of buttons.

As shown in FIG. 4A, the group of control buttons includes information assigning buttons 180-1 to 180-*m*, and control buttons 182-1 to 182-*n*. These buttons are displayed to have pressible forms and sizes. In the present example, the group of control buttons 5 includes 25 buttons of 5 horizontal and 5 vertical in total. The information assigning buttons 180-1 to 180-*p* (for example, p=16) are displayed in four upper rows, and the control buttons 182-1 to 182-*q* (for example, q=5) are displayed in the lowest row. Moreover, the number of buttons to be displayed onto one screen is not limited in the present example.

The information assigning buttons 180 can be defined by the user, and the definition contents are stored in the storage device 110 (FIG. 3) of the control device 100. For this reason, there is a case in which a plurality of information assigning buttons 180 exist and all the information assigning buttons 180 are not settled onto one screen.

Therefore, as shown in FIG. 4B, the information assigning buttons 180 are divided into a plurality of pages, and are displayed onto the information access device 16. In this case, in each control button 182, the number of pages is displayed, and, when any one control button 182 is pressed, the information assigning buttons 180 of the page corresponding to the pressed control button 180 are displayed. For example, if the control button 182, which is displayed as '3', is pressed, the information assigning buttons 180 of the third page are displayed.

Figure 5:
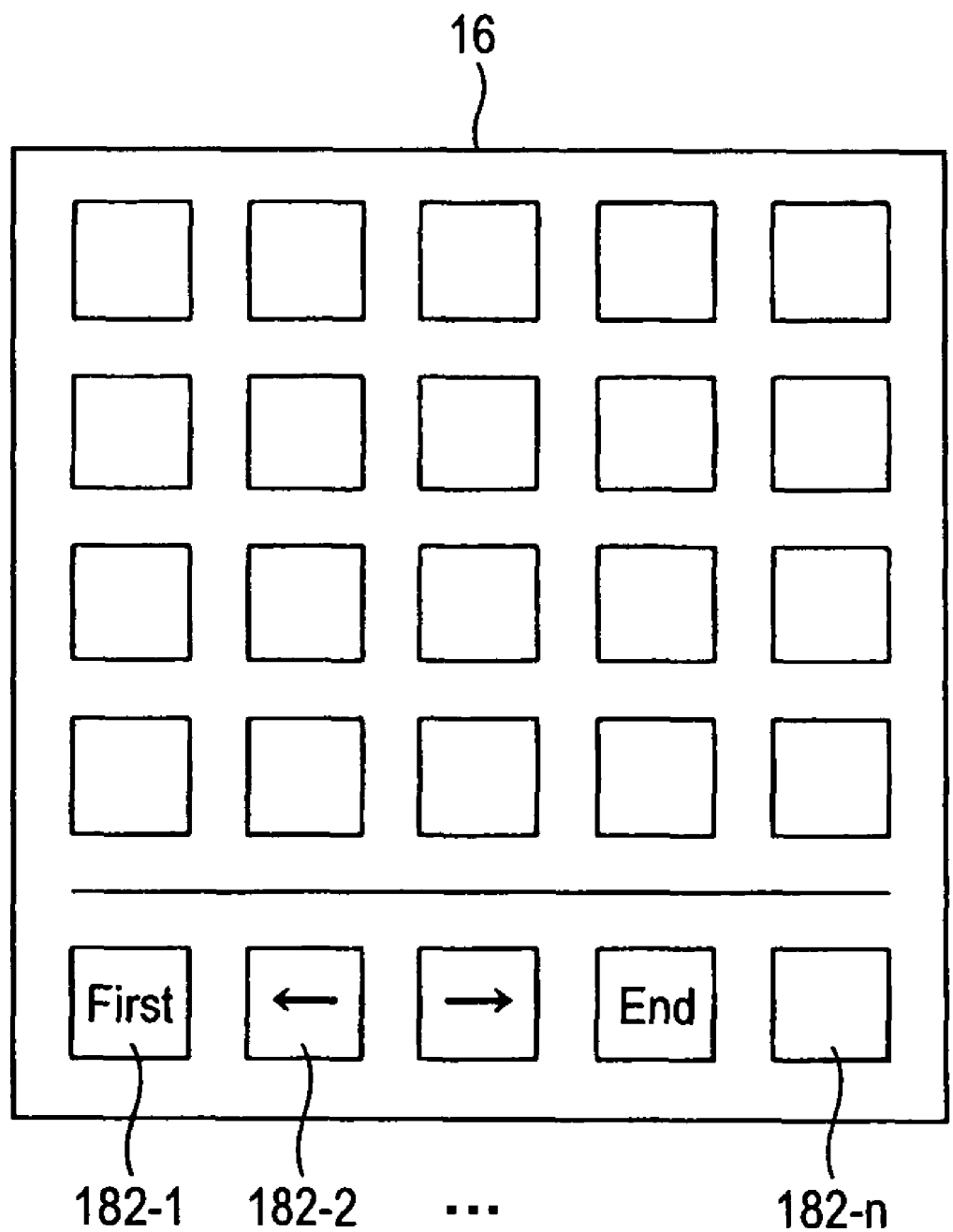
FIG. 5 illustrates a modification of control buttons that manage pages for displaying information assigning buttons.

FIG. 5 illustrates a modification of the control button 182 that manages a page for displaying the information assigning buttons 180.

As shown in FIG. 5, the control buttons 182 may include a 'FIRST' button, a '<-' button, a '->' button, and 'LAST' button. In this case, when the 'FIRST' button is pressed, the information assigning buttons 180 of the first page are displayed. Further, when the '<-' button is pressed, the information assigning buttons 180 of the previous page are displayed, when the '->' button is pressed, the information assigning buttons 180 of the next page are displayed, and, when the 'LAST' button is pressed, the information assigning buttons 180 of the last page are displayed.

FIG. 6 is a diagram illustrating a button attribute management table that defines individual buttons 18.

As shown in FIG. 6, the attributes are given to the individual buttons 18, and these attributes are managed by the button attribute management table.

The button attributes includes a label, a form, a color, a size, a display position, an activation action, an adjective, and an attribute on the content of an allocated action or the content of contents (various attributes including 5W1H).

The label is an identifier for uniquely identifying an individual button 18. The form, the color, and the size define the appearance of the button 18, and the display position is a position where the button 18 is displayed in the information access device 16. The activation action defines an action to be performed by the control device 100 when the button 18 is pressed. For example, corresponding information is displayed onto the display 14, corresponding music is output, and a predetermined arithmetic operation on a plurality of arithmetic objects is performed. For this reason, the button 18 defines different action or function according to a context (message) when being pressed.

Further, each button attribute can be subjected to the arithmetic operation to other button attributes. Moreover, the arithmetic operation of the attributes will be described below.

In the button attribute management table, the button attribute is managed in a form of one button to one row. For example, the button attribute management table is implemented by predetermined spreadsheet software. Further, the button attributes may be managed by use of database software. For example, the button attributes may be managed by a software program called JOHOBAKO (Registered Trademark) available from Fuji Xerox Co., Ltd.

Figure 7A:
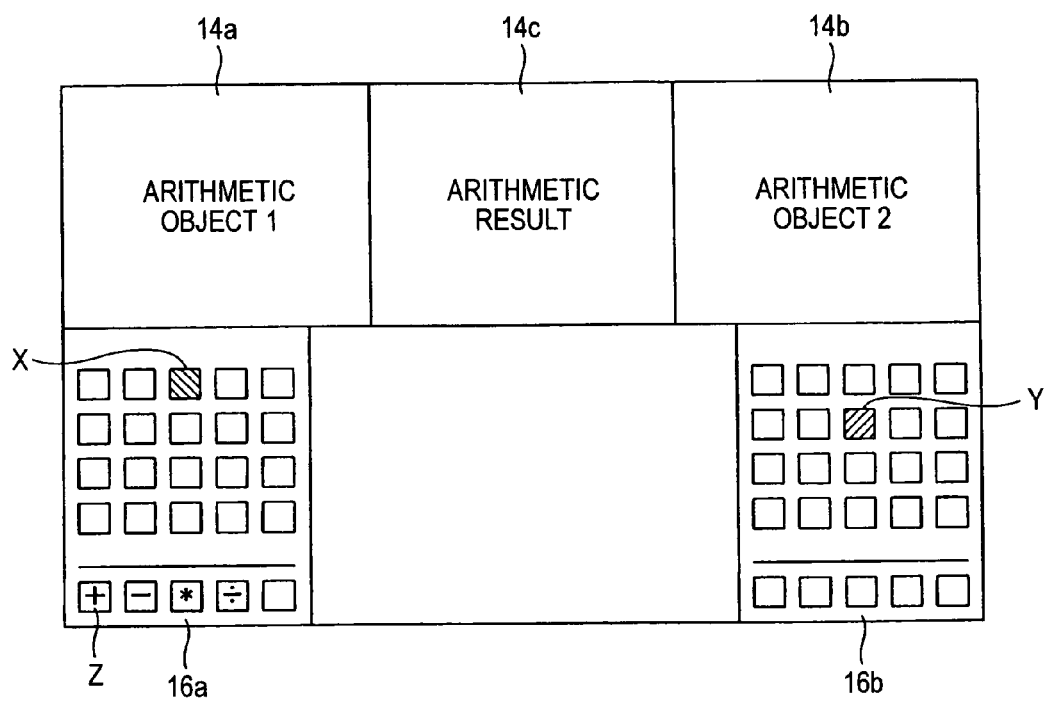
FIGS. 7A to 7C are diagrams illustrating an operation when the button is pressed and an arithmetic operation of arithmetic objects to be assigned by the button.
Figure 7B:
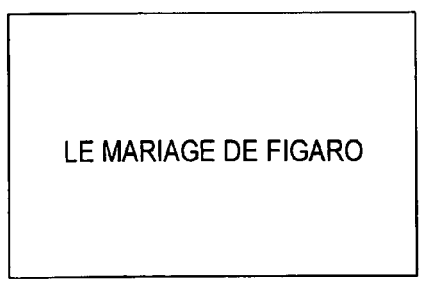
Figure 7C:
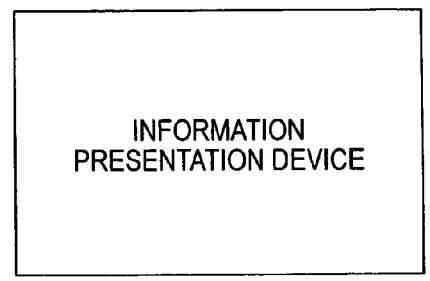

FIGS. 7A to 7C are diagrams illustrating an action when the button 18 is pressed and an arithmetic operation of the arithmetic objects to be defined the button 18.

FIG. 7A is a diagram illustrating the content to be displayed onto the displays 14a to 14c when the button X, Y, and Z displayed onto the information access devices 16a and 16b are pressed. Further, FIG. 7B is a diagram the button X on a magnified scale, and FIG. 7C is a diagram the button Y on a magnified scale. Here, a '+' button, a '−' button, a '*' button, and a '/' button of the button Z constitute an arithmetic button.

In the multilayered task supporting apparatus 10, a predetermined arithmetic operation is performed on information defined by the information assigning button 180 (single term) or various kinds of defined information (multiple terms). Here, the arithmetic operation includes high level/low level, antonymy/synonymy, syndetic synthesis, paradigm expansion, and the like. At this time, the content defined in each term is expanded and displayed onto the left and right displays 14a and 14b from the three displays 14a to 14c, and the arithmetic result is displayed onto the central display 14c.

As shown in FIG. 7A, in a state in which the first content (arithmetic object 1) displayed after the X button is pressed exists, it is assumed that, first, the Z button ('+' button) is pressed, and then the Y button corresponding to the second content (arithmetic object 2, which may be the same as the first content) is pressed. In this case, the arithmetic object 1 is displayed onto the left display 14a, the arithmetic object 2 is displayed onto the right display 14b, and the '+' arithmetic result of the arithmetic object 1 and the arithmetic object 2 is displayed onto the central display 14c.

For example, first, if a button 'LE MARIAGE DE FIGARO' shown in FIG. 7B is pressed, musical data, such as 'LE MARIAGE DE FIGARO' of Mozart, is reproduced, and is output from the speaker. Onto the first display 14a (left display), a pattern suitable for that music or a 'text' of 'LE MARIAGE DE FIGARO' is displayed. Among them, information on Mozart, who is a writer, a situation at the time of the composition, an idea, and the like are included. Further, images, such as a landscape, a street, and a life style at that time, may be displayed. At this time, in the X button, data indicating a place of data, and the attributes of data (format: music, age: modern, school: classical, adjective: fresh, . . . ) are registered, and these attributes are used in a subsequent arithmetic operation.

Next, if the '+' button is pressed, attribute data of the button 'LE MARIAGE DE FIGARO' is stored in an arithmetic object slot (described below) which stores an arithmetic value. When the '+' definition is a sum arithmetic operation (OR arithmetic operation), the sum arithmetic operation is performed between the arithmetic object slot and another arithmetic object slot.

In addition, if a button representing a specification of 'INFORMATION PRESENTATION DEVICE' shown in FIG. 7C is pressed, the specification is displayed onto the second display 14b (light display) as the arithmetic object, and simultaneously the attribute of 'INFORMATION PRESENTATION DEVICE' is set in the '+' arithmetic object slot, such that the arithmetic operation is performed. In this case, new information having the attributes of 'LE MARIAGE DE FIGARO' and 'INFORMATION PRESENTATION DEVICE' is searched, and is displayed onto the third display 14c (central display).

FIG. 8 is a diagram illustrating the attributes to be stored in the arithmetic object slot when the arithmetic operation is performed.

As shown in FIG. 8, at least two arithmetic object slots are prepared. In this case, the attribute of the button 'LE MARIAGE DE FIGARO' is stored in the arithmetic object slot 1 and the attribute of the button 'INFORMATION PRESENTATION DEVICE' is stored in the arithmetic object slot 2. These arithmetic object slots are implemented by the memory 106 or the storage device 110. By doing so, a predetermined arithmetic operation on the attribute stored in the arithmetic object slot 1 and the attribute stored in the arithmetic object slot 2 is performed. Moreover, the '+' arithmetic operation, the '*' arithmetic operation, the '−' arithmetic operation, and '/' arithmetic operation between the attributes will be described below in detail.

Figure 9:
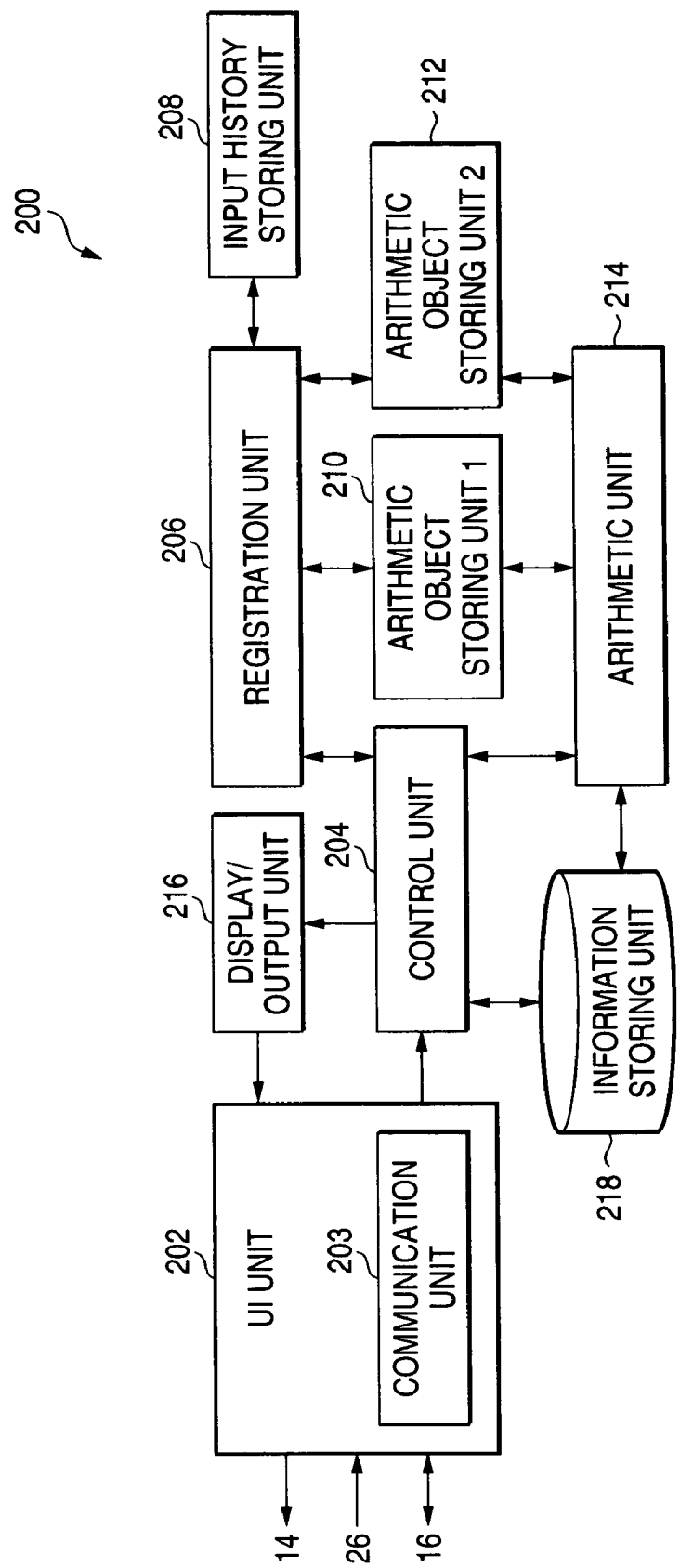
FIG. 9 is a diagram showing the configuration of an arithmetic program to be executed by a control device of the multilayered task supporting apparatus.

FIG. 9 is a diagram showing the configuration of an arithmetic program 200 which is executed by the control device 100 (FIG. 3) of the multilayered task supporting apparatus 10.

As shown in FIG. 9, the arithmetic program 200 has a user interface (UI) unit 202, a communication unit 203, a control unit 204, a registration unit 206, an input history storing unit 208, a first arithmetic object storing unit 210, a second arithmetic object storing unit 212, an arithmetic unit 214, a display/output unit 216 and an information storing unit 218.

With these parts, the arithmetic program 200 receives the input from the information access device 16, in which the group of control buttons for assigning the display object is disposed, controls the display content on the basis of the received input, and displays the controlled display content onto at least one of three or more displays 14 (in the present example, three displays).

The arithmetic program 200 is supplied to the processing device 102 through the network, the communication IF 108 (FIG. 3), and the like, for example, is loaded on the memory 106, and is executed by specifically using hardware on the OS which operates by the processing device 102. Further, the arithmetic program 200 may be executed in all the control devices 100a to 100e or may be executed in any one control device 100.

In the arithmetic program 200, the UI unit 202 receives an operation by the user on the information access device 16, the input device 26, and the foot switch 50, and outputs it to the control unit 204 described below. Here, the operation of the user includes the press of the button 18. Further, the UI unit 202 displays information (image data, musical data, or the like) created by the display/output unit 216 described below and the processed content of each part onto the display 14 and the information access device 16.

The communication unit 203 outputs data through the communication IF 108, and controls the data communication in the multilayered task supporting apparatus 10 through the repeating device 112. Further, the communication unit 203 may perform an encryption processing for preventing information or data to be transmitted from tampering.

The control unit 204 controls the content to be displayed onto the display 14 on the basis of the input from the information access device 16 and the input device 26. More specifically, the control unit 204 controls the registration unit 206 to perform the input history of the button 18 in the information access device 16 and the storage in the arithmetic object slot. Further, the control unit 204 controls the arithmetic unit 214 to perform the arithmetic operation to the attributes stored in the arithmetic object slots, and controls the display/output unit 216 to display the arithmetic result onto the display 14. In addition, the control unit stores information, such as the button attribute management table, image data, musical data, or the like, in the information storing unit 218 described below, and extracts and use the information stored in advance.

The registration unit 206 receives the press of the button 18 of the information access device 16 or the like, and stores the history of the pressed button 18 in the input history storing unit 208 through the control of the control unit 204. Further, as described with reference to FIGS. 7A to 7C, when the predetermined arithmetic operation is performed, the registration unit 206 stores the button attributes in the first arithmetic object storing unit 210 and the second arithmetic object storing unit 212.

The first arithmetic object storing unit 210 stores the button attributes to be stored by the registration unit 206, and implements the slot for the arithmetic object 1 (FIG. 8). The first arithmetic object storing unit 210 is implemented by storing the button attributes in the memory 106 or the storage device 110 of the processing device 102, on which the arithmetic program 200 operates.

Like the first arithmetic object storing unit 210, the second arithmetic object storing unit 212 also stores the button attributes and implements the slot for the arithmetic object 2.

The arithmetic unit 214 performs a predetermined arithmetic operation on at least one of the button attributes stored in the first arithmetic object storing unit 210 and the button attributes stored in the second arithmetic object storing unit 212, and outputs the arithmetic result to the control unit 204. Here, the arithmetic operation includes the '+' arithmetic operation, the '*' arithmetic operation, the '−' arithmetic operation, and the '/' arithmetic operation. Moreover, the arithmetic unit 214 may extract the information stored in the information storing unit 218 so as to perform the arithmetic operation. Moreover, the details of these arithmetic operations will be described below in detail.

The information storing unit 218 stores the button attribute management table (FIG. 8), image data, musical data, and document data to be assigned by the information assigning buttons 180, and other contents. The information storing unit 218 is implemented by the storage device 110 of the control device 100, on which the arithmetic program 200 operates.

Figure 10:
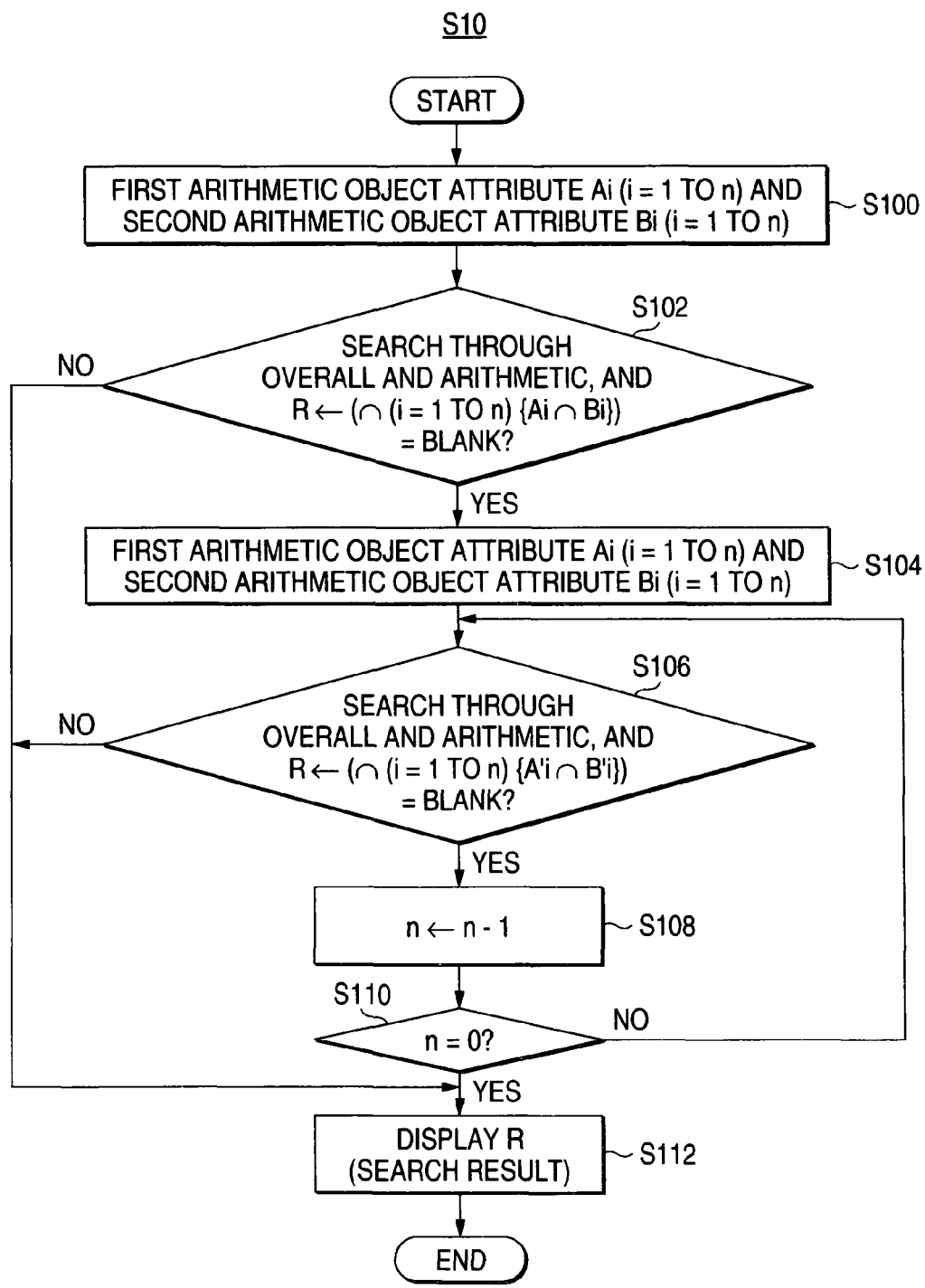
FIG. 10 is a flowchart showing a '+' arithmetic processing (S10) to be executed by an arithmetic unit of the arithmetic program.

FIG. 10 is a flowchart showing the '+' arithmetic processing (S10) which is executed by the arithmetic unit 214 of the arithmetic program 200.

As shown in FIG. 10, at step 100 (S100), the arithmetic unit 214 acquires a first arithmetic object attribute Ai (i=1 to n; n is the number of attributes) from the first arithmetic object storing unit 210, and acquires a second arithmetic object attribute Bi from the second arithmetic object storing unit 212.

At step 102 (S102), the arithmetic unit 214 performs an AND arithmetic operation on the same attribute values, that is, Ai and Bi, and performs an AND arithmetic operation on all the attributes from 1 to n, so as to perform a search. The arithmetic unit 214 judges whether or not the search result R is blank. When the search result R is blank, the process progresses to a step S104. Otherwise, the process progresses to a step S112.

At the step S104 (S104), the arithmetic unit 214 acquires a paradigm expansion A'i (i=1 to n) of the first arithmetic object attribute and a paradigm expansion B'i of the second arithmetic object attribute. Here, the paradigm expansions A'i and B'i are substitutable collections corresponding to the attributes Ai and Bi, and are collections of related words having similarity on the attributes Ai and Bi. For example, the paradigm expansion of the attribute 'VALUE' is 'INFORMATION, WISDOM, INTELLIGENCE, KNOWLEDGE, LEARNING, MENTAL FACULTIES, MENTAL POWERS, IDEA, KNOW-HOW, METHOD, or the like'. Further, the relation of 'PARADIGM EXPANSION' is not intended to similarity. For example, the paradigm expansion may be a collection of the related words through 'CONSENT/SYNONYMY', 'HIGH-LEVEL INSTANCE', 'ASSOCIATION', 'ANTONYMY', or the like on the attributes.

At step 106 (S106), the arithmetic unit 214 performs an AND arithmetic operation on the paradigm expansions A'i and B'i having the same attribute, and performs an AND arithmetic operation on all the paradigm expansions from 1 to n, so as to perform a search. The arithmetic unit 214 judges whether or not the search result R is blank. When the search result R is blank, the process progresses to S108. Otherwise, the process progresses to S112.

At the step 108 (S108), the arithmetic unit 214 decrements n by 1. That is, the arithmetic unit 214 removes the attribute boundary one by one so as to relieve the search condition.

At the step 110 (S110), the arithmetic unit 214 judges whether or not n is 0 (zero). When n is zero, the process progresses to the step S112. Otherwise, the process returns to the step S106, and thus the search is performed again.

At the step 112 (S112), the arithmetic unit 214 outputs the search result R to the control unit 204. When the search result R is blank, the arithmetic unit 214 outputs to the control unit 204 a purport that the '+' arithmetic operation is impossible.

Moreover, the arithmetic method of the '+' arithmetic operation or the like refers to a method disclosed in JP-A-2004-240605 (Sentence Magnification Expression Method, Sentence Magnification Expression Generation Method, and Sentence Magnification Expression generating Apparatus), the entire contents of which is incorporated by reference herein.

Figure 11:
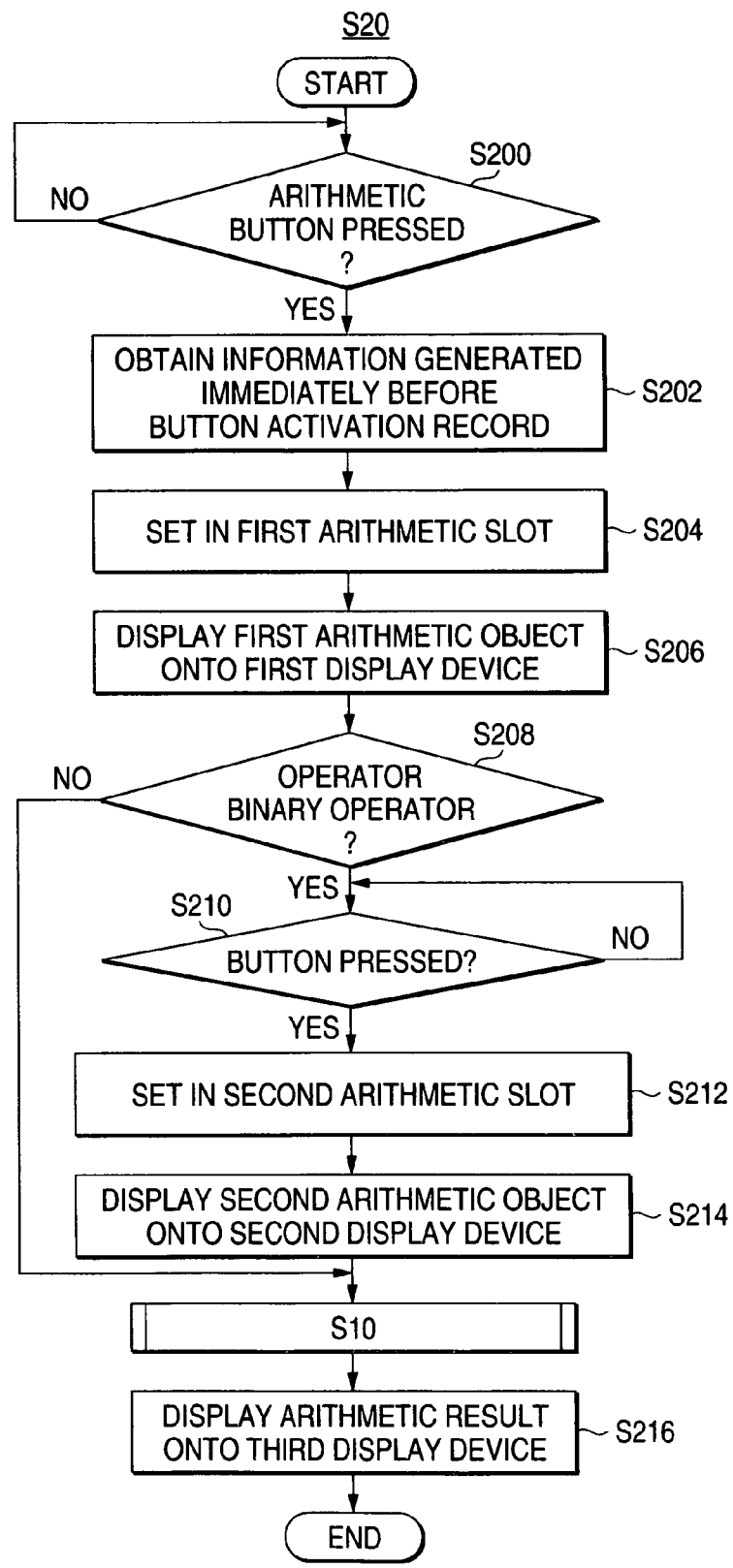
FIG. 11 is a flowchart showing a button arithmetic processing (S20) in the multilayered task supporting apparatus.

FIG. 11 is a flowchart showing a button arithmetic processing (S20) in the multilayered task supporting apparatus 10.

As shown in FIG. 11, at step 200 (S200), the control unit 204 of the arithmetic program 200 (FIG. 9) judges whether or not the user presses an operator button (FIG. 7) of the '+' button or the like from the control buttons 182 displayed onto the information access device 16 of the multilayered task supporting apparatus 10 (FIG. 2). When the operator button is pressed, the control unit 204 progresses the process to S202. Otherwise, the process returns to S200.

At the step 202 (S202), the registration unit 206 refers to the input history storing unit 208 through the control of the control unit 204, and acquires information generated immediately before by the multilayered task supporting apparatus 10 or the arithmetic result.

At step 204 (S204), the registration unit 206 stores the attribute of the information or the arithmetic result (for example, the attribute of the button 'LE MARIAGE DE FIGARO') in the first arithmetic object storing unit 210 (the slot for the arithmetic object 1) through the control of the control unit 204.

At step 206 (S206), the control unit 204 controls the display/output unit 216 to display the first arithmetic object onto the first display 14a (left display; FIG. 2 and FIGS. 7A to 7C). Here, the first arithmetic object may be displayed on the entire surface of the first display 14a or may be display by tiling.

At step 208 (S208), the control unit 204 judges whether or not the operator display by the pressed operator button is a binary operator. When the operator is the binary operator, the control unit 204 progresses the process to S210. Otherwise, the control unit 204 progresses the process to S10, and controls the arithmetic unit 214 to perform the arithmetic operation (for example, '+' arithmetic operation; FIG. 10).

At the step 210 (S210), the control unit 204 judges whether or not any one of the information assigning buttons 180 from the buttons displayed onto the information access device 16 is pressed. When the information assigning button 180 is pressed, the control unit 204 progresses the process to S212. Otherwise, the process returns to S210.

At the step 212 (S212), the registration unit 206 stores the attribute of the pressed information assigning button 180 (for example, the attribute of the button 'INFORMATION PRESENTATION DEVICE') and stores it in the second arithmetic object storing unit 212 (the slot for the arithmetic object 2) through the control of the control unit 204.

At step 214 (S214), the control unit 204 controls the display/output unit 216 to display the second arithmetic object onto the second display 14b (right display).

If the second arithmetic object is displayed, the arithmetic operation (for example, '+' arithmetic operation; FIG. 10) is executed by the arithmetic unit 214.

If the arithmetic processing ends, at step 216 (S216), the control unit 204 controls the display/output unit 216 to display new information having both the attribute of the button 'LE MARIAGE DE FIGARO' and the attribute of the button 'INFORMATION PRESENTATION DEVICE' onto the third display 14c. Moreover, when the arithmetic result is blank, a purport that the arithmetic operation is impossible is displayed onto the third display 14c.

As described above, the multilayered task supporting apparatus 10 according to the present invention has the three or more displays 14a to 14c, the information access devices 16a and 16b, in which the group of control buttons for assigning the display object is disposed, and the control unit that controls the contents to be displayed onto the displays 14a to 14c on the basis of the input from the information access devices 16a and 16b. In particular, the display 14 is provided in front, and the information access device 16 is provided on at least one of left and right sides before the display 14.

Accordingly, the user can simply and rapidly perform the access to the information, perform the expression of the contents to be accessed in parallel, and efficiently and pleasantly perform various tasks.

In the multilayered task supporting apparatus 10 according to the present invention, in the information access device 16, a group of buttons including the operator button is provided, and, to each button, the information or action corresponds. Further, the information access device 16 has a touch panel.

Accordingly, the user can intuitively and easily operate, and physically and easily perform the operation between information, including the arithmetic operation or the like, in a wide information space.

Next, the '*' arithmetic processing, the '−' arithmetic processing, and the '/' arithmetic processing, which are executed in the present embodiment, will be described. In the multilayered task supporting apparatus 10 according to the present embodiment, as shown in FIG. 7A, the operator buttons of the '*' button, the '−' button, and the '/' button are provided. In the arithmetic program 200, the arithmetic unit 214 executes the arithmetic processing according to the arithmetic processing input from the control device 204.

The '*' arithmetic processing performs a syndetic synthesis processing.

Here, the term 'syndetic' means a range, that is, represents that the individual parts are connected according to connectedness. For example, a sentence that "Provides a method for actually performing an amalgamation of knowledge or arithmetic operation." is represented by a significant range in which the individual parts of "Provides"+"a"+"method"+"for"+"actually"+"performing"+"an"+"amalgamation"+"of"+"knowledge"+"or"+"arithmetic"+"operation".

According to the syndetic synthesis, the arithmetic unit 214 extracts only the attribute times from now or sampled from the first arithmetic object, and extracts the remainder from the second arithmetic object, so as to create the search condition. In this case, the search operation is made by a method of assigning the attribute from the first arithmetic object until a candidate is found, and thus multiple variations exist. Hereinafter, a method in which continuous and discontinuous acquisitions are alternately performed will be described.

Figure 12:
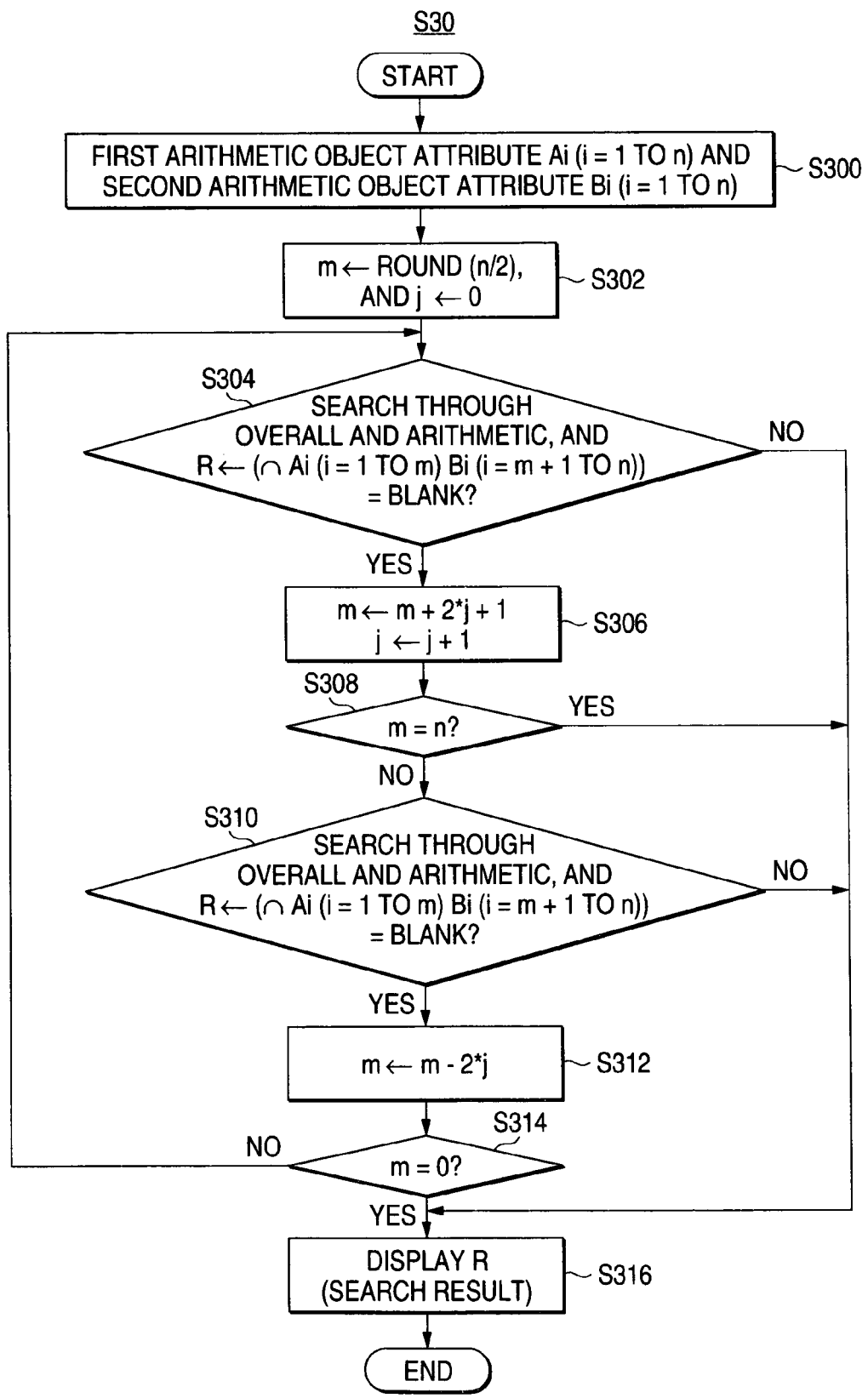
FIG. 12 is a flowchart showing a '*' arithmetic processing (S30) to be executed by the arithmetic unit 214 of the arithmetic program.

FIG. 12 is a flowchart showing the '*' arithmetic processing (S30) which is executed by the arithmetic unit 214 of the arithmetic program 200.

As shown in FIG. 12, at step 300 (S300), the arithmetic unit 214 acquires the first arithmetic object attribute $A_i$ (i=1 to n) from the first arithmetic object storing unit 210 and acquires the second arithmetic object attribute $B_i$ from the second arithmetic object storing unit 212.

At step 302 (S302), the arithmetic unit 214 substitutes m with a value obtained by dividing n by 2 and rounding off to the nearest integer for the initialization. Further, the arithmetic unit 214 also substitutes j with 0 for the initialization.

At step 304 (S304), the arithmetic unit 214 performs all the AND arithmetic operations on $A_i$ (where i=1 to m) and $B_i$ (where i=m+1 to n) so as to perform a search. It is judged whether or not the search result R is blank, and, when the search result is blank, the process progresses to S306. Otherwise, the process progresses to S316.

At the step 306 (S306), the arithmetic unit 214 substitutes m with 'm+2*j+1' and increments j by 1.

At step 308 (S308), the arithmetic unit 214 judges whether or not m is equal to n, and, when m is equal to n, the process progresses to S316. Otherwise, the process progresses to S310. By doing so, m is made larger than half of n.

At the step 310 (S310), the arithmetic unit 214 performs all the AND arithmetic operations on Ai (where i=1 to m) and Bi (where i=m+1 to n) so as to perform a search. It is judged whether or not the search result R is blank, and, when the search result is blank, the process progresses to S312. Otherwise, the process progresses to S316.

At the step 312 (S312), the arithmetic unit 214 substitutes m with 'm−2*j'.

At step 314 (S314), the arithmetic unit 214 judges whether or not m is 0 (zero), and, when m is zero, the process progresses to S316. Otherwise, the process progresses to S310. By doing so, m is made smaller than half of n, and then the subsequent processing is performed.

At the step S316 (S316), the arithmetic unit 214 outputs the search result R to the control unit 204. When the search result R is blank, the arithmetic unit 214 outputs to the control unit 204 a purport that the '+' arithmetic operation is impossible. Here, when plural results exist, the plural results are automatically and sequentially displayed when a next candidate button is pressed or at predetermined time. Alternatively, the plural results may be simultaneously displayed. The display method may be set in advance by the user or may be selected at the time of display. Moreover, a standard display method of the multilayered task supporting apparatus 10 is, for example, simultaneous and parallel display.

In the '−' arithmetic processing (subtraction processing), when the same value exist as the attribute value, the arithmetic unit 214 subtracts the search result by the parts having the same value from the search result by the first arithmetic object attribute.

Figure 13:
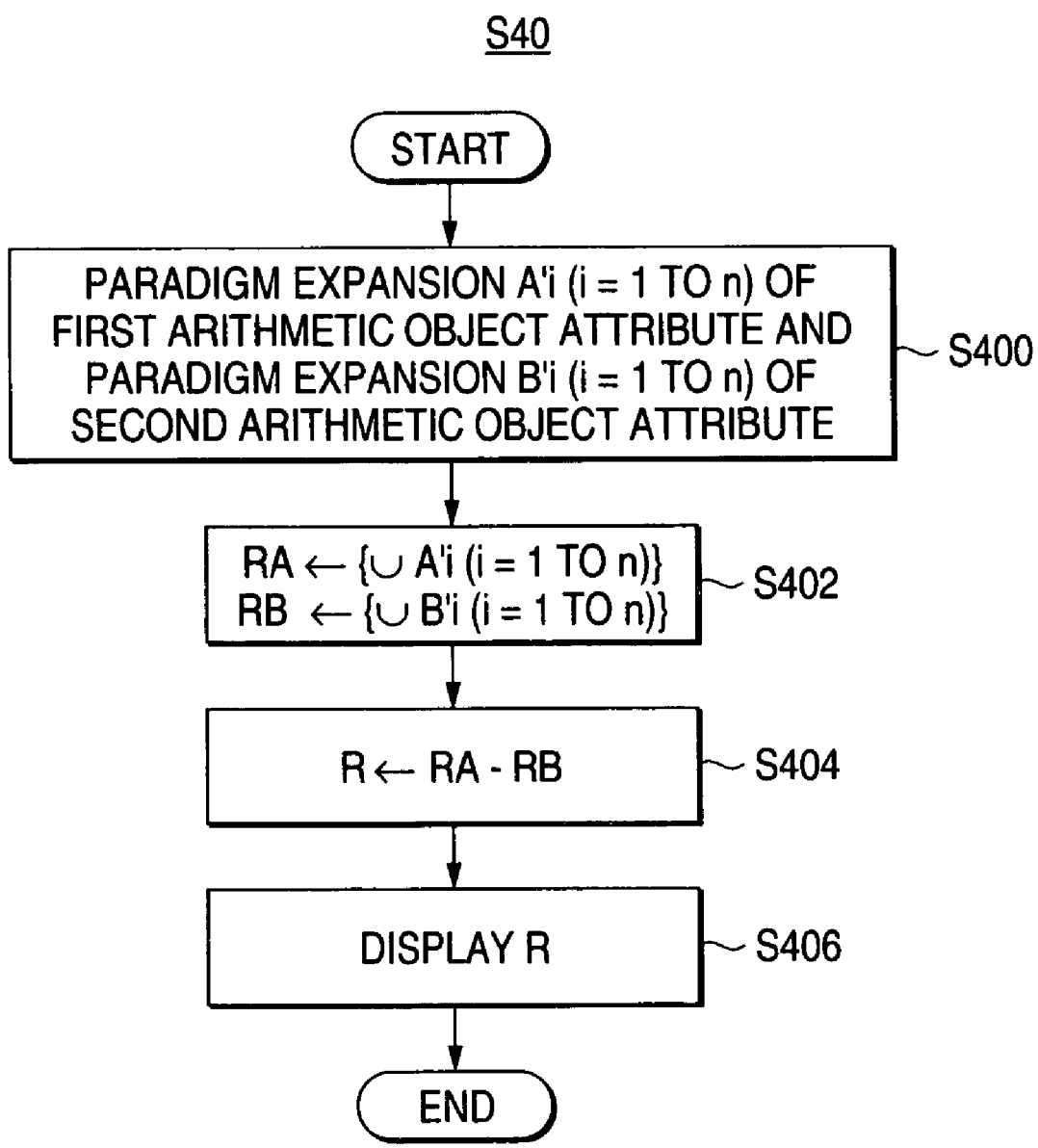
FIG. 13 is a flowchart showing a '−' arithmetic processing (S40) to be executed by the arithmetic unit of the arithmetic program.

FIG. 13 is a flowchart showing the '−' arithmetic processing (S40) which is executed by the arithmetic unit 214 of the arithmetic program 200.

As shown in FIG. 13, at step 400 (S400), the arithmetic unit 214 acquires the paradigm expansion A'i (i=1 to n) of the first arithmetic object attribute and the paradigm expansion B'i of the second arithmetic object attribute.

At step 402 (S402), the arithmetic unit 214 performs an OR arithmetic operation on all the first arithmetic object attributes from 1 to n subjected to the paradigm expansion, and substitutes RA with the result. Similarly, the arithmetic unit 214 performs the OR arithmetic operation on the second arithmetic object attribute subjected to the paradigm expansion, and substitutes RB with the result.

At step 404 (S404), the arithmetic unit 214 substitutes R with the result obtained by subtracting RB from RA.

At step 406 (S406), the arithmetic unit 214 outputs the search result R to the control unit 204. When the search result R is blank, the arithmetic unit 214 outputs to the control unit 204 a purport that the '−' arithmetic operation is impossible.

In the '/' arithmetic processing (division processing), from the fact that '/' is the multiplication of a reciprocal number, the arithmetic unit 214 performs the paradigm expansion on all the attributes of the second arithmetic object by 'negation=antonym', and then performs the '*' arithmetic processing.

Figure 14:
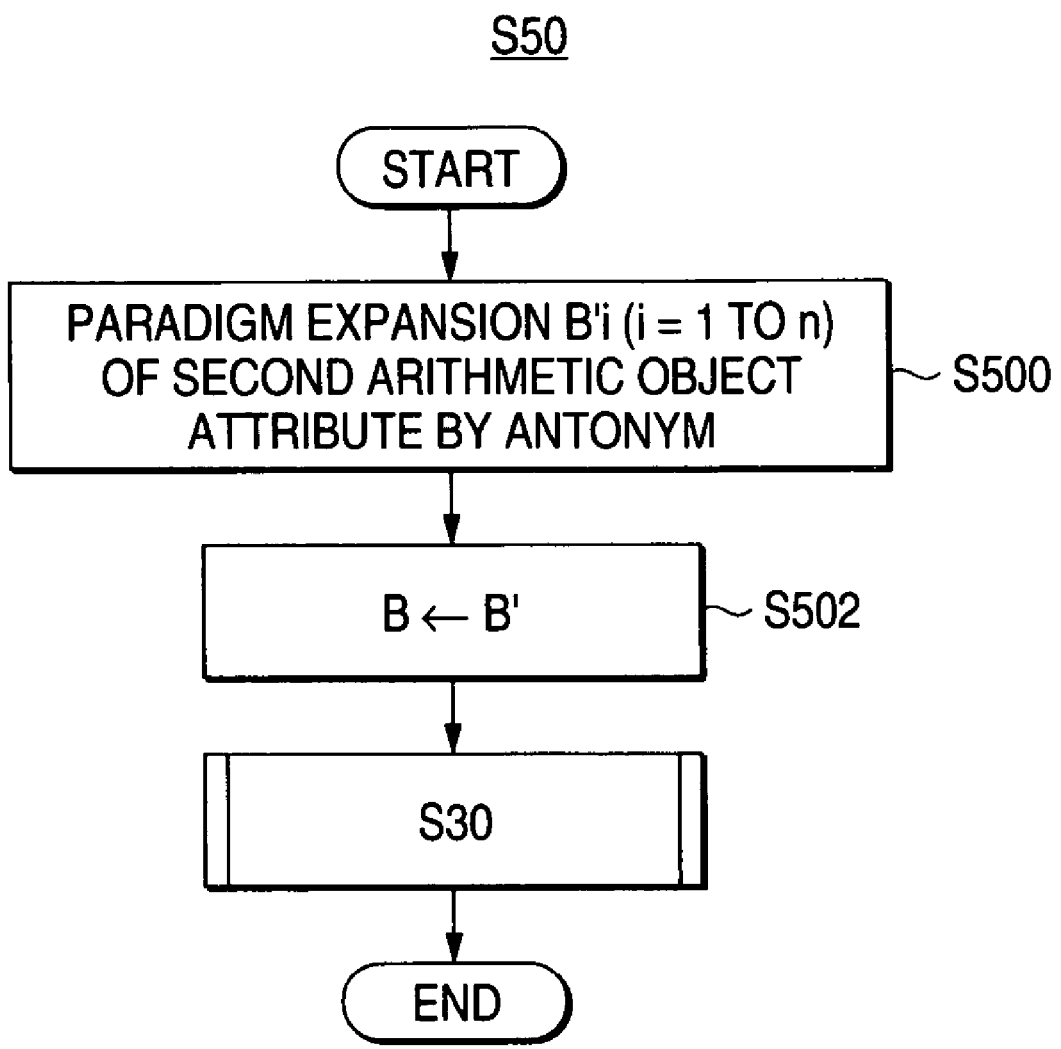
FIG. 14 is a flowchart showing a '/' arithmetic processing (S50) to be executed by the arithmetic unit of the arithmetic program.

FIG. 14 is a flowchart showing the '/' arithmetic processing (S50) which is executed by the arithmetic unit 214 of the arithmetic program 200.

At step 500 (S500), the arithmetic unit 214 acquires the paradigm expansion B'i by the antonym of all the second arithmetic object attributes Bi when i is from 1 to n.

At step 502 (S502), the arithmetic unit 214 substitutes B with the acquired paradigm expansion B'i.

And then, the arithmetic unit 214 performs the '★' arithmetic processing (FIG. 12; S30).

Further, the multilayered task supporting apparatus 10 may display synonymy, similarity, relation, antonymy, or the like, which does not the second arithmetic object, in the group of control buttons of the information access device 16 as the operator, in addition to four rules of arithmetic operations. Further, the multilayered task supporting apparatus 10 may display a logical operator, such as exclusive logical sum or the like, in the group of control buttons in common. In this case, in the arithmetic program 200, the arithmetic unit 214 receives the arithmetic processing corresponding to each button from the control unit 204, and performs the arithmetic processing by use of the attributes stored in the first arithmetic object storing unit 210 or the like.

Next, a modification of the present embodiment will be described.

In the multilayered task supporting apparatus 10, at least one of the displays 14 may be a touch panel. Accordingly, the user can naturally perform the operation of the display object (move or cross) by a length of an operation feeling of the group of control buttons in the information access device 16.

Further, in the chair 60 with a display device (FIG. 1), the display devices 64a and 64b may be covered, for example, with a tempered glass. Accordingly, the display device 64 can be resistant against an impact.

The display devices 64a and 64b are used as a fourth display and a fifth display by the lengths of the displays 14a to 14c. Accordingly, the user can confirm the information around the waist, and thus a wide information space can be implemented. The chair 60 with a display device may have the control device (FIG. 3), and the user can confirm the information by use of the display device 64, and perform the edition, like a normal PC.

In addition, the multilayered task supporting apparatus 10 can allocate the operator button of the '+' button or the like to at least one pedal 52 of the foot switch 50a. Accordingly, the user operates the foot switch, not pressing the '+' button displayed onto the information access device 16, thereby performing the arithmetic operation. Therefore, it is possible to operate more efficiently. Further, the multilayered task supporting apparatus 10 does not need to display the '+' button onto the information access device 16, thereby arranging various buttons.

Here, the multilayered task supporting apparatus 10 can allocate an instruction, representing at which of the three displays 14a a cursor is positioned, or may allocate 'next candidate' key for searching and displaying expanded information or the group of buttons, to the foot switch 50. Further, a function of turning on or off power supplies of all the control devices 100 at one time may be allocated. Moreover, the multilayered task supporting apparatus 10 may receive the input through a foot keyboard or a keyboard (not shown) in addition to the foot switch 50.

For example, to the pedals 52a to 52c, functions of copy, cut, and paste are sequentially allocated. Further, to the pedals 52a to 52c, functions of shift, alt, and enter, functions of left move, stop, and right move, and functions of left end (head), next (one right), and right end (end) may be allocated.

Second Embodiment

Next, a multilayered task supporting apparatus 10 according to a second embodiment will be described.

The multilayered task supporting apparatus 10 according to the present embodiment is different from the first embodiment in that at least one of an arithmetic input start button and an arithmetic input end button is provided.

Figure 15A:
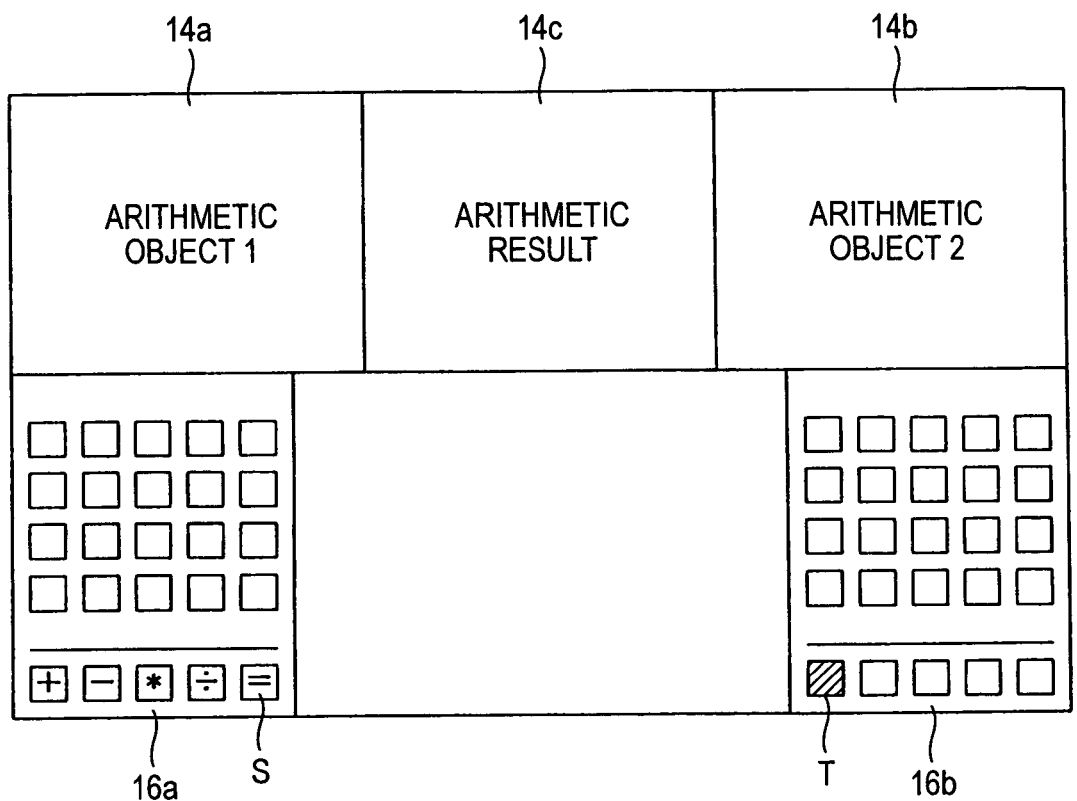
FIGS. 15A and 15B are diagrams illustrating a group of control buttons to be displayed on an information access device of a multilayered task supporting apparatus according to a second embodiment.
Figure 15B:
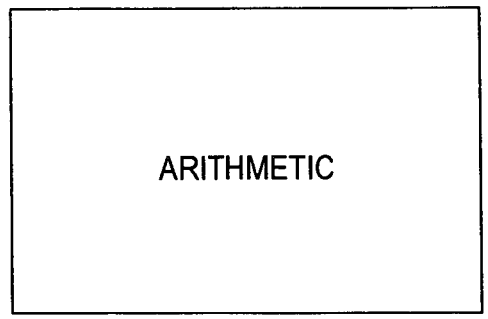

FIGS. 15A and 15B are diagrams illustrating a group of control buttons to be displayed onto an information access device 16 of the multilayered task supporting apparatus 10 according to the present embodiment.

FIG. 15A is a diagram showing a button S ('=' button) serving as the arithmetic input end button and a button T serving as the arithmetic input start button provided in the information access device 16a. FIG. 15B is a diagram showing the button T on a magnified scale.

In the multilayered task supporting apparatus 10 according to the present embodiment, for example, if the buttons are pressed in an order of 'ARITHMETIC', 'A', '+', 'B', and '=', the content of A is displayed onto the first display 14a (left display), the content of B is displayed onto the second display 14b (right display), and the content of C is displayed onto the third display 14c (central display).

In addition, for example, if the buttons are pressed in an order of 'ARITHMETIC', 'A', '+', 'B', '+', 'C', '+', 'D', and '=', the arithmetic objects on A to D are alternately displayed onto the left and right displays to be divided until the '=' button is pressed. The intermediate result may be dynamically displayed in such a manner of A+B, A+B+C, or A+B+C+D. Further, the arithmetic result may not be displayed until the '=' button is pressed.

Moreover, in the present embodiment, since the multilayered task supporting apparatus 10 has the arithmetic start button, when the operator button of the '+' button or the like is pressed, the attribute of information corresponding to a previous button may be stored in the arithmetic object slot.

FIG. 16 is a flowchart illustrating a button arithmetic processing (S60) in the multilayered task supporting apparatus 10 according to the second embodiment of the invention. In addition, the process having the same reference numeral as that of the button operation process (S20) is the same as S20.

As shown in FIG. 16, at step 600 (S600), the control unit 204 for the operation program 200 (FIG. 9) determines whether the user pushes the arithmetic input start button (the button T of FIG. 15) of the control buttons 182 displayed on the information access device 16 of the multilayered task supporting apparatus 10. The control unit 204 progresses the process to a step 602 (S602) when the arithmetic input start button is pressed. Otherwise, the process progresses to a step 600 (S600).

At step 602 (S602), the control unit 204 controls the registering unit 206 to reset the content stored in the first arithmetic object storage unit 210 (the slot for the arithmetic object 1) and the second arithmetic object storage unit 210 (the slot for the arithmetic object 2).

Next, at steps 200 to 206 (S200 to S206), when the user pushes one of the information assigning buttons 180, an attribute of this button is stored in the slot for the arithmetic object 1, and the first arithmetic object is displayed on the first display 14a.

At step 604 (S604), the control unit 204 determines whether the user pushes the operator button, such as the '+' button. The control unit 204 progresses the process a step 208 (S208) when the operator button is pressed. Otherwise, the process progresses to a step 604 (S604).

At steps 208 to 214 (S208 to S214), it is determined whether the operator is a binary operator. When the user pushes one of the information assigning buttons 180, an attribute of this button is stored in the slot for the arithmetic object 2, and the second arithmetic object is displayed on the second display 14b.

Further, an arithmetic process (S10) corresponding to the '+' button is performed.

At step 606 (S606), the control unit 204 determines whether the user pushes the arithmetic input end button (the button S of FIG. 15) of the control buttons 182 displayed on the information access device 16 of the multilayered task supporting apparatus 10. The control unit 204 progresses the process the step 216 (S216) when the arithmetic input end button is pressed. Otherwise, the process progresses to the step 606 (S606). At the step 216 (S216), the arithmetic results are displayed on the third display 14c.

As described above, at least one of the arithmetic input start button and the arithmetic input end button is provided in the information access device 16 of the multilayered task supporting apparatus 10 according to this embodiment. In this way, the user can intuitively and easily perform an operation between a plurality of information items.

Next, a method of editing button attributes of buttons 18 displayed on the information access device 16 will be described. Each of the buttons 18 is displayed on the information access device 16 to have predetermined shape, size, and display location, and the button attribute thereof is changed by keeping pressing a predetermined range, which is defined for each of the buttons 18, for a predetermined period of time.

Figure 17A:
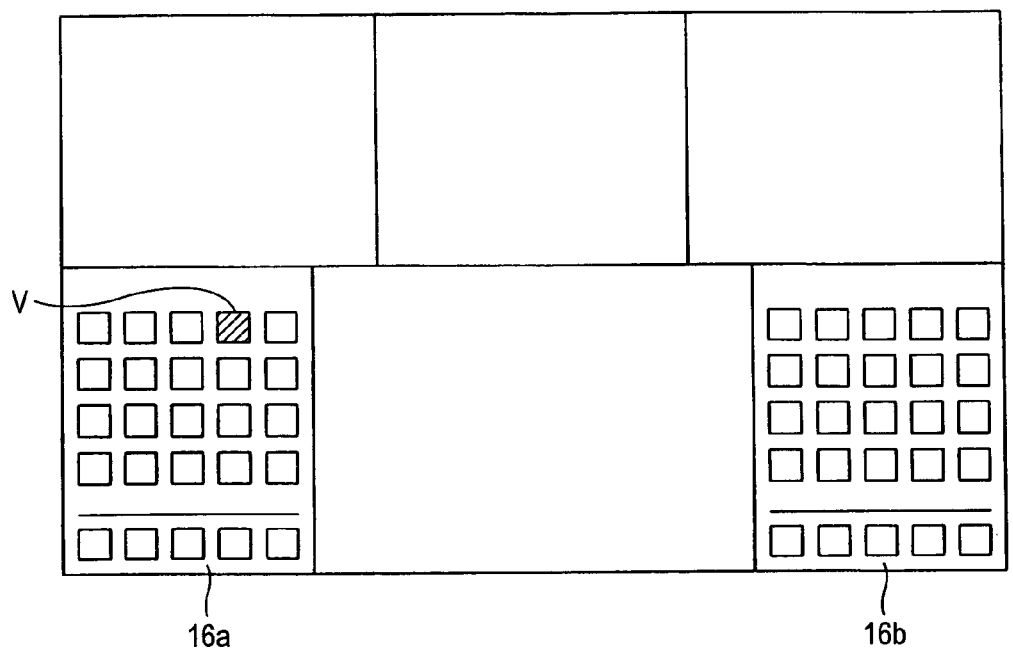
FIGS. 17A to 17C are diagrams illustrating a button attribute edition mode, and specifically.
Figure 17B:
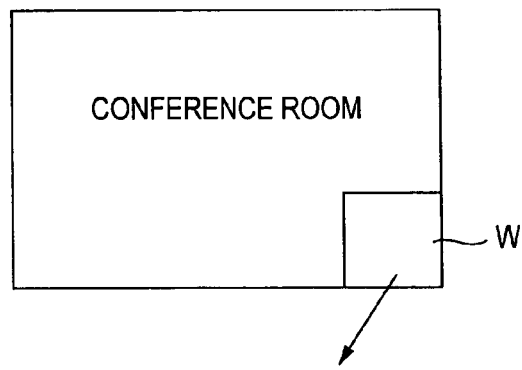
Figure 17C:
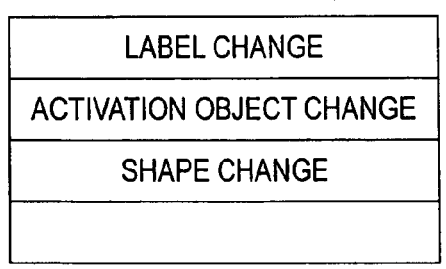

FIGS. 17A and 17B are views illustrating an editing mode of a button attribute. Here, FIG. 17B is an enlarged view where a button V shown in FIG. 17A is enlarged and FIG. 17C is a view exemplifying a screen displayed when the range W shown in FIG. 17B is kept being pressed.

As shown in FIG. 17B, when a user keeps pressing the range W of the button V (button of a conference room) for a predetermined period of time (for example, for two seconds), a control device 100 of a multilayered task supporting apparatus 10 executes the edition mode of a button attribute. In the edition mode, as shown in FIG. 17C, the control device 100 of the multilayered task supporting apparatus 10 displays an edition item on the information access device 16. Thus, the user can change the label of a button, a object to be operated, or attributes. In addition, the execution mode is not limited to the editing mode, but another mode may be executed when the range W and another range are kept being pressed.

Further, an edition button (not shown) may be provided for the group of control buttons of the information access device 6. After the editing button is pressed, when one button of the group of control buttons is pressed, the editing mode is performed for information assigned for the pressed button. Similarly, a deletion button (not shown) may be provided for the group of control buttons of the information access device 6. After the deletion button is pressed, when one button of the group of control buttons is pressed, information assigned for the pressed button may be deleted.

As such, the task set can be defined as a group of buttons.

Figure 18A:
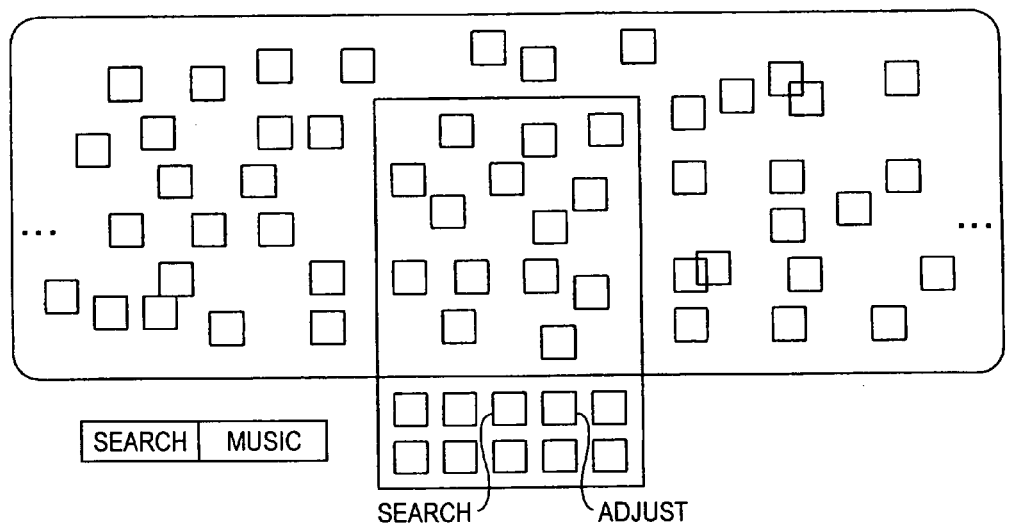
FIGS. 18A and 18B are diagrams illustrating a task set to be displayed on the information access device, and specifically.
Figure 18B:
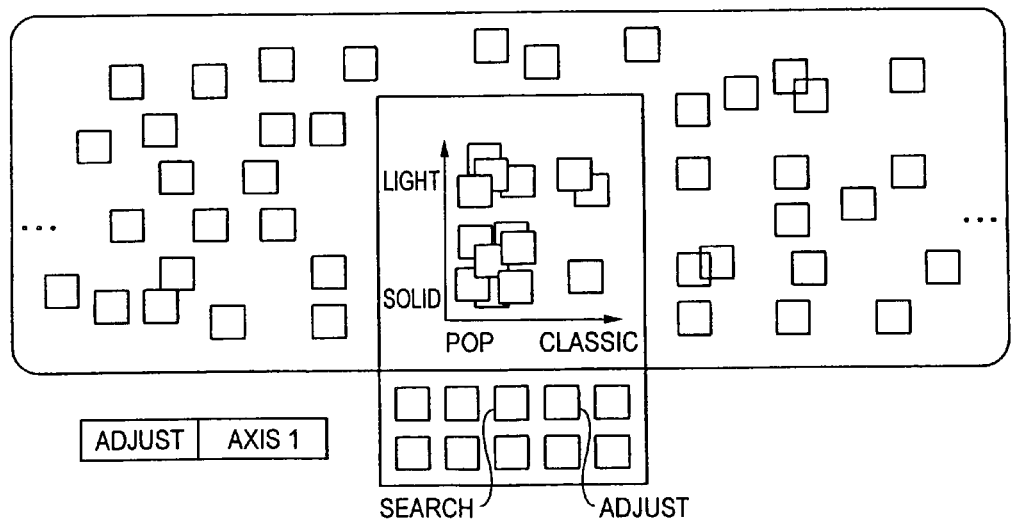

FIGS. 18A and 18B are diagrams illustrating the task set displayed on the information access device 16. Here, FIG. 18A illustrates a task set searched by using a button attribute with 'MUSIC' a keyword, and FIG. 18B illustrates a view in which a plurality of searched buttons are classified according to an even more specific attribute.

As shown in FIGS. 18A and 18B, the multilayered task supporting apparatus 10 displays, on the information access device 16, buttons included in a predetermined task set of a plurality of registered buttons. The plurality of buttons included in the task set may be alphabetically disposed by using, for example, the label of the button attribute. Further, the multilayered task supporting apparatus 10 may perform a predetermined search and display the result as a group.

Third Embodiment

Next, a multilayered task supporting apparatus 10 according to a third embodiment will be described.

Figure 19:
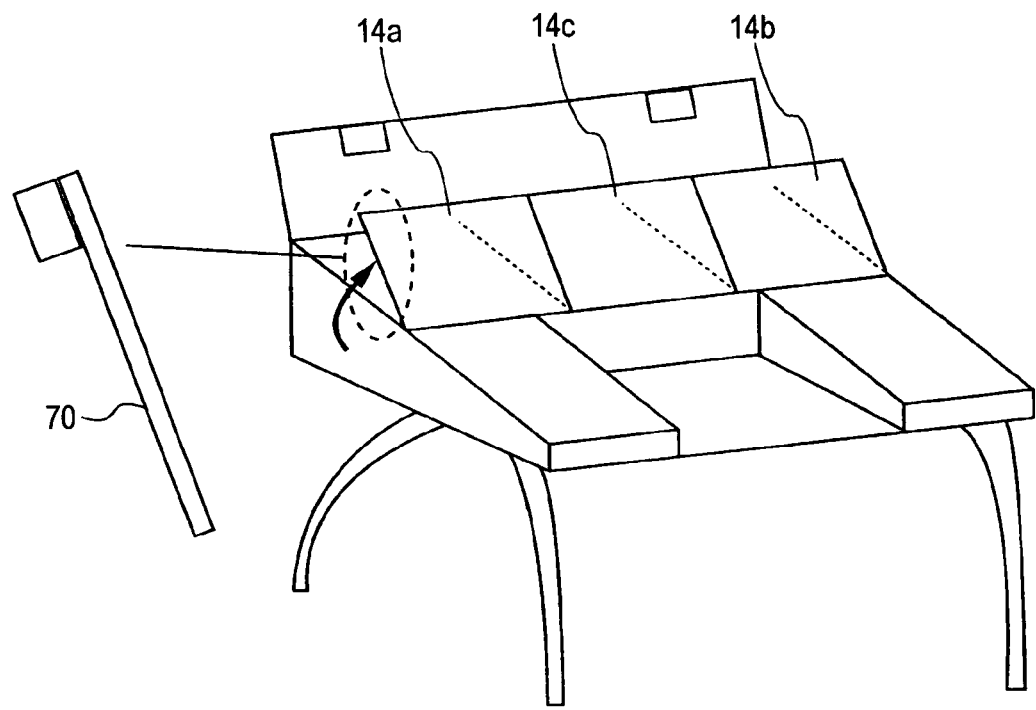
FIG. 19 is a diagram showing a multilayered task supporting apparatus according to a third embodiment.

FIG. 19 is a diagram showing the multilayered task supporting apparatus 10 according to the third embodiment.

As shown in FIG. 19, the multilayered task supporting apparatus 10 according to this embodiment is different from that of the first embodiment in that the angles of display devices 14 are varied.

The angles of the display devices 14a to 14c are varied, and the change of the angles of the display devices 14a to 14c is performed by directly operating a plate 70 which supports the display devices. Further, the angles of the display devices 14a to 14c may be separately changed.

Mechanism for changing the angles may be realized by using functions of individual PCs such as a notebook type computer (laptop computer), for example, angle adjusting devices (not shown) may be added on both sides of the apparatus main body 12.

Fourth Embodiment

Next, a multilayered task supporting apparatus 10 according to a fourth embodiment will be described.

Figure 20:
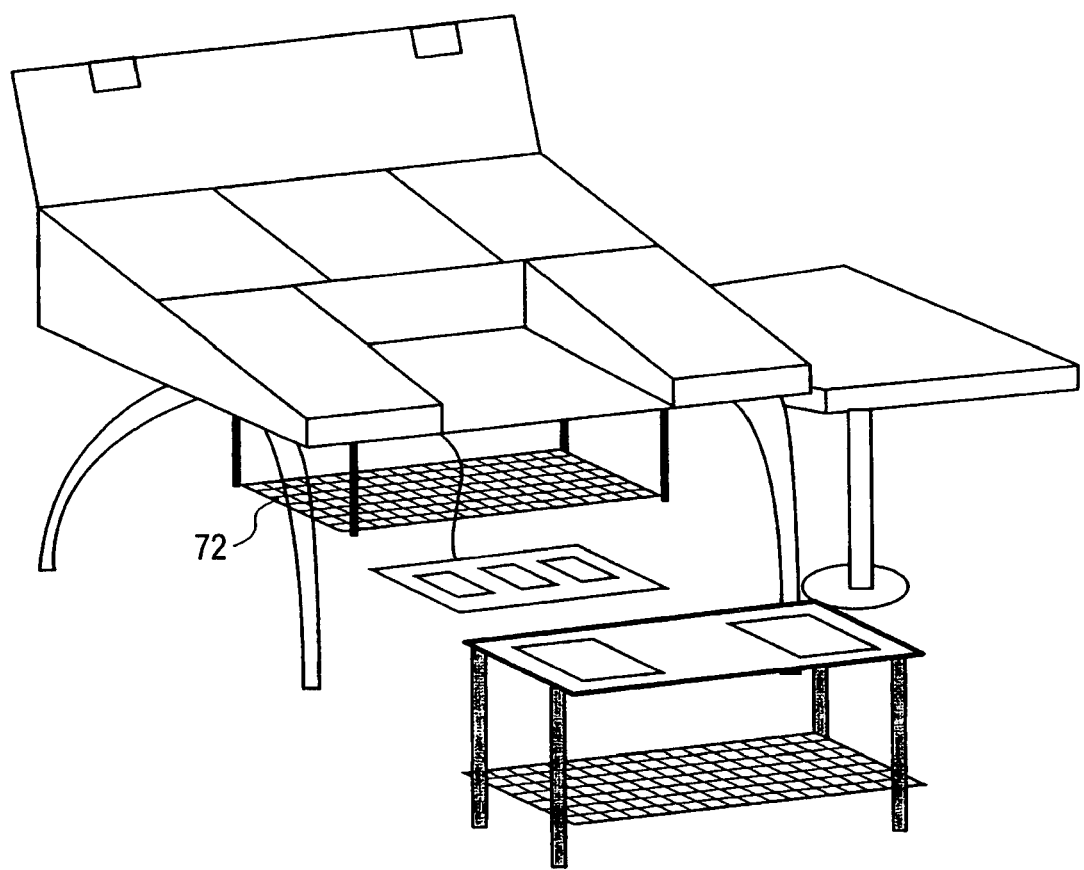
FIG. 20 is a diagram showing a multilayered task supporting apparatus according to a fourth embodiment.

FIG. 20 is a diagram showing the multilayered task supporting apparatus 10 according to this embodiment.

As shown in FIG. 20, the multilayered task supporting apparatus 10 according to this embodiment is different from the first embodiment in that a second storage 72 is provided below the apparatus main body 12. Therefore, since the user can secure a large storage space in addition to the storage 68 provided below the chair 60 with a display device, it is possible to utilize a hybrid information space including papers, pens, books, and other physical goods.

Fifth Embodiment

Next, a multilayered task supporting apparatus 10 according to a fifth embodiment will be described.

Figure 21:
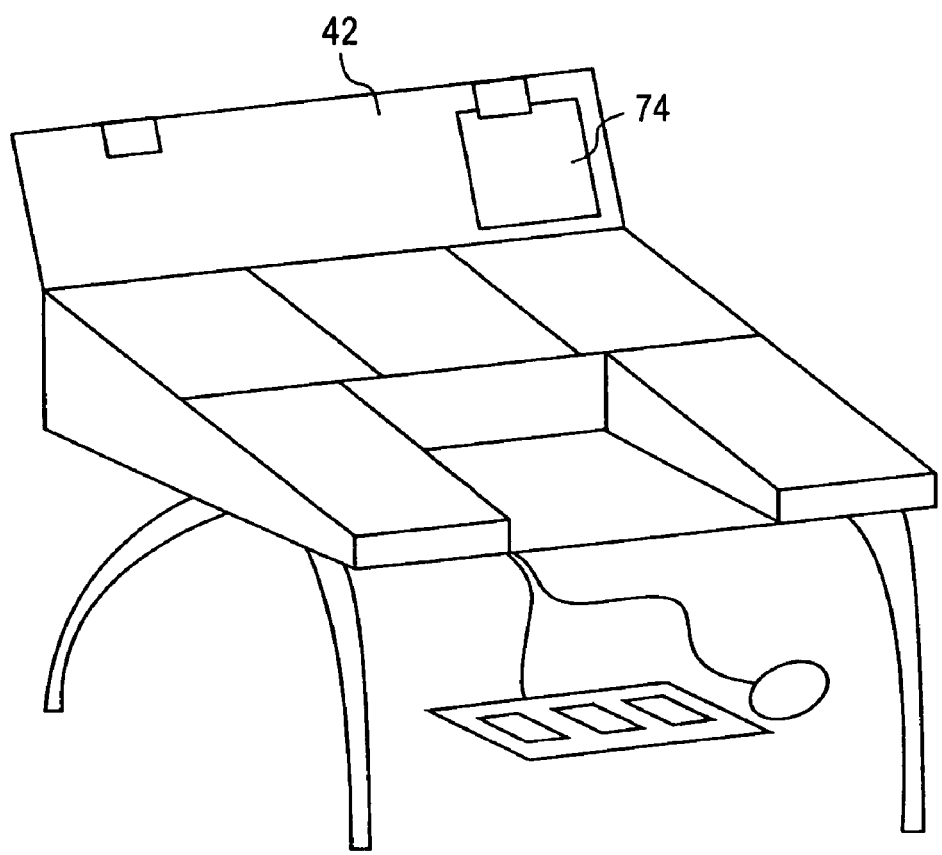
FIG. 21 is a diagram showing a multilayered task supporting apparatus according to a fifth embodiment.

FIG. 21 is a diagram showing the multilayered task supporting apparatus 10 according to this embodiment.

As shown in FIG. 21, the multilayered task supporting apparatus 10 according to this embodiment is different from the first embodiment in that an optical writing electronic paper 74 is provided on a part or entire of the cover panel 42. The electronic paper 74 outputs read information to a control unit 100. Therefore, a user can easily obtain a copy of information concerning the type of papers and can flexibly operate the information.

Sixth Embodiment

Next, a multilayered task supporting apparatus 10 according to a sixth embodiment will be described.

Figure 22:
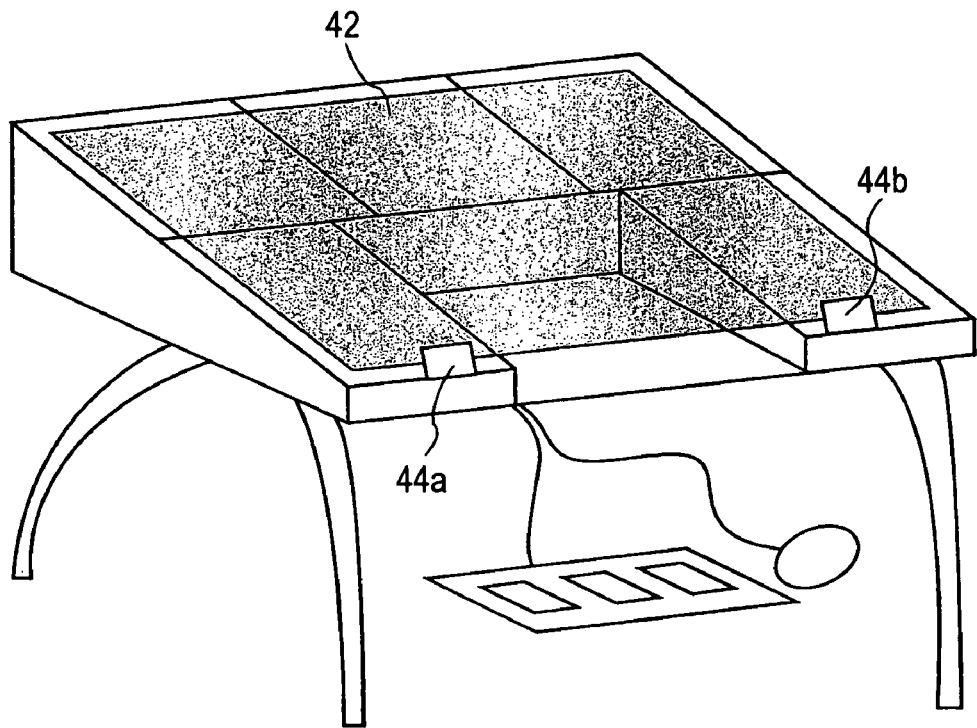
FIG. 22 is a diagram showing a multilayered task supporting apparatus according to a sixth embodiment.

FIG. 22 is a diagram showing the multilayered task supporting apparatus 10 according to this embodiment.

As shown in FIG. 22, it is preferable that the cover panel 42 is closed to lock the apparatus main body 12 by using keys 44a and 44b. Therefore, it is possible to improve the safety of the multilayered task supporting apparatus 10 and to prevent the malice operation by a third party.

The protection of electronic data may be implemented by use of a security mechanism of a general PC or the like, and a general desk environment needs to be put in order, since, in the state in which the documents are expanded, the recovery cannot be made. If the cover panel 42 is closed, the documents are turned down, and the contents are prevented from being viewed. Further, in a state in which the documents are disposed on the top surface of the apparatus main body 12, all the documents can reopen at that state by a locking mechanism, such as the key 44 or the like. Therefore, the operation of the user can be efficiently performed, and productivity can be enhanced.

As described with reference to the embodiments, an access to information can be simply performed at high speed, and representation of contents to be accessed can be performed in parallel.

In the foregoing description, there are described of embodiments to which the present invention is applied. However, various modifications can be made without departing from the scope of the invention. Examples will be briefly discussed hereinbelow.

One example for performing the '+' arithmetic processing is to add a "selected value list" in one of the arithmetic object slot, thereby to set the selected item/value or character string in a document or in a web site. Thereafter, the item (value)/character string that is selected in the first display information, and the item (value)/character string that is selected in the second display information, are synthesized into a third display medium for displaying. This process provides an electronic editing supporting function that generates a new document by cutting and pasting necessary parts from a plurality of information. This process is advantageous by comparison to the known multi-window system in that this process provides a novel method to visualize generating of a new document whereas the original arithmetic objects being displayed as is.

First Display Example

>Name) Fuji Zero-tarou
Sex) Male
Theme) Multilayered task supporting
>Comment) Excessive stress, however the productivity improves, may cause adverse impact on humanity, so that there needs to be taken care of sufficiently.

Second Display Example

>Name) Fuji Zero-mi
Sex) Female
Theme) Concentrated task supporting
>Comment) Stress is not always 'bad' but may exhibit advantage that improves one's motivation and concentration.

[Display Example of the Result of Arithmetic]
Name) Fuji Zero-tarou
Comment) Excessive stress, however the productivity improves, may cause adverse impact on humanity, so that there needs to be taken care of sufficiently.
Name) Fuji Zero-mi
Comment) Stress is not always 'bad' but may exhibit advantage that improves one's motivation and concentration.

In the above shown example, the items selected by the ">" mark are synthesized and listed.

The following arithmetic may be available by combining a plurality of arithmetic operator.

A first task of drafting a specification for patent application and a second task of drafting an article, are designated and a UNION (sum-of-sets arithmetic) is performed.

In the first task, items of: title of the invention; inventor; scope of claims; field of the invention; backgrounds; problems to be solved; means for solving the problems; detailed description; examples; advantages of the invention; and brief description of drawings, are input into the arithmetic object slots.

In the second task, items of: title of the article; author; overview; backgrounds of research; object; prior researches; assumption of research; planning of experiment; result of experiment; analysis; examination; summary; future direction; address of thanks; and references, are input into the arithmetic object slots.

When performing the sum-of-sets arithmetic process, the items that have high commonality with each other are identified by using predetermined commonality determining dictionary. Example of the items in the first and second task that have high commonality are those such as: "title of the invention" and "title of the article"; "inventor" and "author"; "problems to be solved" and "backgrounds of research"; "backgrounds" and "prior researches"; and "advantages of the invention" and "summary".

Thereafter, the multilayered task is supported by displaying the synthesizing compression schedule as shown below and the result of calculation of the advantage of the compression (as such that value "200" becomes value "120" after compression).

1. Determining the title of the invention and the title of the article simultaneously.
2. Determining the inventor and the author simultaneously.
3. Organize the backgrounds and prior researches simultaneously.
4. Write the problems to be solved and the backgrounds of research simultaneously.
5. Write the detailed description (only for the first task).
6. Write the assumption of research, planning of experiment, and result of experiment (only for the second task).
7. Write the advantages of the invention and the overview simultaneously.
8. Write the remaining items such as description of the drawings and scope of the invention (only for the first task).
9. Write the remaining items such as summary, future direction, address of thanks, and references (only for the second task).

The invention is not limited to the embodiments described above, and various modifications are possible without departing from the spirit and scope of the invention. The components of the embodiments can be combined with each other arbitrarily without departing from the spirit and scope of the invention.

The entire disclosure of Japanese Patent Application No. 2005-272052 filed on Sep. 20, 2005 including specification, claims, drawings and abstract is incorporated herein by reference in its entirety.

[FIG. 1]
MULTILAYERED TASK SUPPORT SYSTEM 1
[FIG. 3]
14a: DISPLAY

-continued

100a: CONTROL DEVICE
102: PROCESSING DEVICE
106: MEMORY
108: COMMUNICATION I/F
110: STORAGE DEVICE
2: NETWORK
14b: DISPLAY
100b: CONTROL DEVICE
112: REPEATING DEVICE
26: INPUT DEVICE
14c: DISPLAY
100c: CONTROL DEVICE
16a: INFORMATION ACCESS DEVICE
100d: CONTROL DEVICE
16b: INFORMATION ACCESS DEVICE
100e: CONTROL DEVICE
[FIG. 4B]
SECOND PAGE
THIRD PAGE
FOURTH PAGE
[FIG. 5]
FIRST
LAST
[FIG. 6]
BUTTON ATTRIBUTE MANAGEMENT TABLE
LABEL
COLOR
DISPLAY POSITION
FORM
ACTIVATION ACTION
ADJECTIVE
[FIG. 7A]
ARITHMETIC OBJECT 1
ARITHMETIC RESULT
ARITHMETIC OBJECT 2
[FIG. 7B]
LE MARIAGE DE FIGARO
[FIG. 7C]
INFORMATION PRESENTATION DEVICE
[FIG. 8]
BUTTON ATTRIBUTE
LABEL
DISPLAY POSITION
COLOR
FORM
EFFECT SOUND 1
EFFECT SOUND 2
SLOT FOR ARITHMETIC OBJECT 1
LE MARIAGE DE FIGARO
SLOT FOR ARITHMETIC OBJECT 2
INFORMATION PRESENTATION DEVICE
CONTENT ATTRIBUTE
CONTENT ATTRIBUTE KW (PLURAL)
CLASSIC, OPERA
LE MARIAGE DE FIGARO, OPERA
MOZART, CLASSICAL SCHOOL
WIEN
CLASS STRUGGLE
SPLENDID, LIGHT
MUSIC
PLURAL, THOROUGH GRASP
INFORMATION PRESENTATION DEVICE
YOKOHAMA
PATENT APPLICATION
HARD, THICK
SPECIFICATION, DOCUMENT, CHARACTER
[FIG. 9]
14: DISPLAY DEVICE
26: INPUT DEVICE
16: INFORMATION ACCESS DEVICE
202: UI UNIT
203: COMMUNICATION UNIT
216: DISPLAY/OUTPUT UNIT
204: CONTROL UNIT
218: INFORMATION STORING UNIT
206: REGISTRATION UNIT
210: ARITHMETIC OBJECT STORING UNIT 1
214: ARITHMETIC UNIT
208: INPUT HISTORY STORING UNIT

-continued

212: ARITHMETIC OBJECT STORING UNIT 2
ARITHMETIC PROGRAM 200
[FIG. 10]
START
S100: FIRST ARITHMETIC OBJECT ATTRIBUTE Ai
(i = 1 TO n) AND SECOND ARITHMETIC
OBJECT ATTRIBUTE Bi (i = 1 TO n)
S102: SEARCH THROUGH OVERALL AND
ARITHMETIC, AND R <- (∩ (i = 1 TO n)
[Ai ∩ Bi]) = BLANK?
S104: PARADIGM EXPANSION A'i (i = 1 TO n) OF
FIRST ARITHMETIC OBJECT ATTRIBUTE
AND PARADIGM EXPANSION B'i (i = 1 TO n)
OF SECOND ARITHMETIC OBJECT ATTRIBUTE
S106: SEARCH THROUGH OVERALL AND
ARITHMETIC, AND R <- (∩ (i = 1 TO n)
[A'i ∩ B'i]) = BLANK?
S112: DISPLAY R (SEARCH RESULT)
END
'+' ARITHMETIC PROCESSING S10
[FIG. 11]
START
S200: ARITHMETIC BUTTON PRESSED?
s202: OBTAIN INFORMATION GENERATED
IMMEDIATELY BEFORE BUTTON
ACTIVATION RECORD
S204: SET IN FIRST ARITHMETIC SLOT
S206: DISPLAY FIRST ARITHMETIC OBJECT
ONTO FIRST DISPLAY DEVICE
S208: OPERATOR IS BINARY OPERATOR?
S210: IS BUTTON PRESSED?
S212: SET IN SECOND ARITHMETIC SLOT
S214: DISPLAY SECOND ARITHMETIC OBJECT
ONTO SECOND DISPLAY DEVICE
S216: DISPLAY ARITHMETIC RESULT ONTO
THIRD DISPLAY DEVICE
END
BUTTON ARITHMETIC PROCESSING S20
[FIG. 12]
START
S300: FIRST ARITHMETIC OBJECT ATTRIBUTE
Ai (i = 1 TO n) AND SECOND ARITHMETIC
OBJECT ATTRIBUTE Bi (i = 1 TO n)
S302: m ROUND (n/2), AND j 0
S304: SEARCH THROUGH OVERALL AND
ARITHMETIC, AND R <- (∩ Ai (i = 1 TO m)
Bi (i = m + 1 TO n)) = BLANK?
S310: SEARCH THROUGH OVERALL AND
ARITHMETIC, AND R <- (∩ Ai (i = 1 TO m)
Bi (i = m + 1 TO n)) = BLANK?
S316: DISPLAY R (SEARCH RESULT)
END
'*' ARITHMETIC PROCESSING S30
[FIG. 13]
START
S400: PARADIGM EXPANSION A'i (i = 1 TO n) OF
FIRST ARITHMETIC OBJECT ATTRIBUTE AND
PARADIGM EXPANSION B'i (i = 1 TO n) OF SECOND
ARITHMETIC OBJECT ATTRIBUTE
S406: DISPLAY R
END
'−' ARITHMETIC PROCESSING S40
[FIG. 14]
START
S500: PARADIGM EXPANSION B'i (i = 1 TO n) OF SECOND
ARITHMETIC OBJECT ATTRIBUTE BY ANTONYM
END
'/' ARITHMETIC PROCESSING S50
[FIG. 15A]
ARITHMETIC OBJECT 1
ARITHMETIC RESULT
ARITHMETIC OBJECT 2
[FIG. 15B]
ARITHMETIC
[FIG. 16]
START
S600: ARITHMETIC START BUTTON PRESSED?
S602: RESET ARITHMETIC TABLE
S200: BUTTON PRESSED?
S204: SET IN FIRST ARITHMETIC SLOT
S206: DISPLAY FIRST ARITHMETIC OBJECT
ONTO FIRST DISPLAY DEVICE
S604: ARITHMETIC BUTTON PRESSED?
S208: OPERATOR BINARY OPERATOR?
S210: BUTTON PRESSED?
S212: SET IN SECOND ARITHMETIC SLOT
S214: DISPLAY SECOND ARITHMETIC OBJECT
ONTO SECOND DISPLAY DEVICE
S606: IS ARITHMETIC END BUTTON PRESSED?
S216: DISPLAY ARITHMETIC RESULT ONTO
THIRD DISPLAY DEVICE
END
BUTTON ARITHMETIC PROCESSING S60
[FIG. 17B]
CONFERENCE ROOM
[FIG. 17C]
LABEL CHANGE
ACTIVATION OBJECT CHANGE
SHAPE CHANGE
[FIG. 18A]
SEARCH
MUSIC
SEARCH
ADJUST
[FIG. 18B]
ADJUST
AXIS 1
LIGHT
SOLID
POP
CLASSIC
SEARCH
ADJUST

What is claimed is:

1. A multilayered task supporting apparatus comprising:
a display area that is divided into three or more display segments, the display segments including a first display segment and at least two second display segments, wherein
one of the second display segment displays a first arithmetic object,
the other of the second display segment displays a second arithmetic object, and
the first display segment displays an arithmetic result calculated by using at least one non-numeral content attribute of the first arithmetic object and at least one non-numeral content attribute of the second arithmetic object;
an input unit including foot pedals and plural groups of control buttons, wherein each of the groups is associated with a corresponding second display segment, respectively, the control buttons of each group are used to designate display objects to be displayed on the corresponding second display segment, and each control button has a changeable display for displaying a symbol;
a control unit that controls contents to be displayed on the display area based on an input from the input unit, the input being at least one of a sentence magnification expression processing, syndetic synthesis processing, subtraction processing or division processing, wherein the foot pedals control the display area through the control unit.

2. The multilayered task supporting apparatus according to claim 1, wherein the display area is provided at a front portion of the multilayered task supporting apparatus.

3. The multilayered task supporting apparatus according to claim 1, wherein the input unit is provided on at least one of left and right sides and before the display area.

4. The multilayered task supporting apparatus according to claim 1, wherein the input unit is provided with operator buttons.

5. The multilayered task supporting apparatus according to claim 4, wherein the input unit is provided with at least one of an arithmetic input start button and an arithmetic input end button.

6. The multilayered task supporting apparatus according to claim 1, wherein the input unit has a touch panel.

7. The multilayered task supporting apparatus according to claim 1, further comprising an install portion in which a predetermined object is to be installed.

8. The multilayered task supporting apparatus according to claim 1, further comprising:
   an input history storing unit, wherein the control unit controls the storage of the input history of the control buttons in the input history storing unit.

9. A method for supporting multilayered task, the method comprising:
   receiving an input from an input unit including foot pedals and plural groups of control buttons;
   controlling a display content based on the received input, the input being at least one of a sentence magnification expression processing, syndetic synthesis processing, subtraction processing or division processing;
   displaying the controlled display content onto at least one of three or more display areas wherein the three or more display areas include a first display segment and at least two second display segments, wherein
   one of the second display segment displays a first arithmetic object,
   the other of the display segment displays a second arithmetic object, and
   the first display segment displays an arithmetic result calculated by using at least one content attribute of the first arithmetic object and at least one content attribute of the second arithmetic object;
   associating each of the groups with a corresponding second display segment respectively, the control buttons of each group are used to designate display objects to be displayed on the corresponding second display segment, and each control button has a changeable display for displaying a symbol; and
   controlling the at least one of three or more display area with the foot pedals.

10. A non-transitory computer-readable medium storing a program product for causing a computer system to execute procedures for supporting multilayered task, the process comprising:
   receiving an input from an input unit including foot pedals and plural groups of control buttons;
   controlling a display content based on the received input, the input being at least one of a sentence magnification expression processing, syndetic synthesis processing, subtraction processing or division processing;
   displaying the controlled display content onto at least one of three or more display areas, wherein the three or more display areas include a first display segment and at least two second display segments, wherein
   one of the second display segment displays a first arithmetic object,
   the other of the display segment displays a second arithmetic object, and
   the first display segment displays an arithmetic result calculated by using at least one non-numeral content attribute of the first arithmetic object and at least one non-numeral content attribute of the second arithmetic object;
   associating each of the groups with a corresponding second display segment, respectively, the control buttons of each group are used to designate display objects to be displayed on the corresponding second display segment, and each control button has a changeable display for displaying a symbol; and
   controlling the at least one of three or more display area with the foot pedals.

* * * * *